(12) United States Patent
Middlesworth et al.

(10) Patent No.: US 10,717,255 B2
(45) Date of Patent: Jul. 21, 2020

(54) POLYMERIC FILMS AND METHODS FOR MAKING POLYMERIC FILMS

(71) Applicant: Berry Plastics Corporation, Evansville, IN (US)

(72) Inventors: Jeffrey A. Middlesworth, Wauconda, IL (US); Brooke D. Kitzmiller, North Canton, OH (US); Vadim G. Zaikov, Eau Claire, WI (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 15/341,103

(22) Filed: Nov. 2, 2016

(65) Prior Publication Data

US 2017/0129228 A1    May 11, 2017

Related U.S. Application Data

(60) Provisional application No. 62/251,415, filed on Nov. 5, 2015.

(51) Int. Cl.
*B32B 27/20* (2006.01)
*B29C 55/08* (2006.01)
(Continued)

(52) U.S. Cl.
CPC ........ *B32B 27/205* (2013.01); *B29C 48/0018* (2019.02); *B29C 48/08* (2019.02);
(Continued)

(58) Field of Classification Search
CPC . B32B 27/065; B32B 27/205; B32B 2250/03; B32B 2250/04; B32B 2250/05; B32B 2250/40; B32B 3/26; B32B 27/08; B32B 27/32; B32B 2250/242; B32B 2307/54; B32B 2307/558; B32B 2307/718; B32B 2264/10; B32B 27/306;
(Continued)

(56) References Cited

U.S. PATENT DOCUMENTS 3,347,962 A * 10/1967 Dieck ................. B29C 47/0021
159/11.1
3,520,964 A    7/1970 Metz, Jr.
(Continued)

FOREIGN PATENT DOCUMENTS

CA        2802583 A1    12/2010
CN      100430221 C     11/2004
(Continued)

OTHER PUBLICATIONS

Tegethoff, E. Wolfgang, Calcium Carbonate From the Cretaceous Period into the 21 st Century, p. 310,2001, Springer Basel AG, Germany.
(Continued)

*Primary Examiner* — Jeffrey M Wollschlager
(74) *Attorney, Agent, or Firm* — Barnes & Thornburg LLP

(57) ABSTRACT

Multi-layer films include at least one cavitated core layer that is microporous and breathable, and at least one skin layer. The cavitated core layer includes a polyolefin and an inorganic filler dispersed in the polyolefin. Methods for forming polymeric films and articles of manufacture prepared therefrom are described.

20 Claims, 5 Drawing Sheets

(51) Int. Cl.

| | | |
|---|---|---|
| *B29C 48/00* | (2019.01) | |
| *B29C 48/21* | (2019.01) | |
| *B32B 27/36* | (2006.01) | |
| *B32B 3/26* | (2006.01) | |
| *B32B 27/40* | (2006.01) | |
| *B32B 27/28* | (2006.01) | |
| *B32B 27/34* | (2006.01) | |
| *B32B 27/12* | (2006.01) | |
| *B32B 27/30* | (2006.01) | |
| *B32B 5/02* | (2006.01) | |
| *B32B 7/12* | (2006.01) | |
| *B29C 48/88* | (2019.01) | |
| *B29C 48/08* | (2019.01) | |
| *B29C 55/18* | (2006.01) | |
| *B29C 71/02* | (2006.01) | |
| *B32B 27/08* | (2006.01) | |
| *B32B 27/32* | (2006.01) | |
| *B29C 55/14* | (2006.01) | |
| *B29K 105/04* | (2006.01) | |
| *B29K 509/00* | (2006.01) | |
| *B29K 23/00* | (2006.01) | |
| *B29K 105/16* | (2006.01) | |
| *B29K 509/02* | (2006.01) | |
| *B29L 7/00* | (2006.01) | |
| *B29L 9/00* | (2006.01) | |

(52) U.S. Cl.
CPC ............ *B29C 48/21* (2019.02); *B29C 48/914* (2019.02); *B29C 48/916* (2019.02); *B29C 48/917* (2019.02); *B29C 48/9155* (2019.02); *B29C 48/9165* (2019.02); *B29C 55/08* (2013.01); *B29C 55/14* (2013.01); *B29C 55/146* (2013.01); *B29C 55/18* (2013.01); *B29C 71/02* (2013.01); *B32B 3/26* (2013.01); *B32B 3/266* (2013.01); *B32B 5/022* (2013.01); *B32B 7/12* (2013.01); *B32B 27/08* (2013.01); *B32B 27/12* (2013.01); *B32B 27/28* (2013.01); *B32B 27/306* (2013.01); *B32B 27/32* (2013.01); *B32B 27/34* (2013.01); *B32B 27/36* (2013.01); *B32B 27/40* (2013.01); *B29C 2071/022* (2013.01); *B29C 2071/025* (2013.01); *B29K 2023/00* (2013.01); *B29K 2105/041* (2013.01); *B29K 2105/16* (2013.01); *B29K 2509/00* (2013.01); *B29K 2509/02* (2013.01); *B29L 2007/008* (2013.01); *B29L 2009/00* (2013.01); *B32B 2250/03* (2013.01); *B32B 2250/242* (2013.01); *B32B 2250/44* (2013.01); *B32B 2264/10* (2013.01); *B32B 2264/101* (2013.01); *B32B 2264/102* (2013.01); *B32B 2264/104* (2013.01); *B32B 2264/12* (2013.01); *B32B 2307/406* (2013.01); *B32B 2307/514* (2013.01); *B32B 2307/54* (2013.01); *B32B 2307/558* (2013.01); *B32B 2307/718* (2013.01); *B32B 2307/724* (2013.01); *B32B 2307/7248* (2013.01); *B32B 2555/00* (2013.01); *B32B 2555/02* (2013.01)

(58) Field of Classification Search
CPC ......... B32B 27/34; B32B 27/40; B32B 3/266; B32B 2250/44; B32B 2264/101; B32B 2264/102; B32B 2264/104; B32B 2264/12; B32B 2307/406; B32B 5/022; B32B 7/12; B32B 27/12; B32B 27/28; B32B 27/36; B32B 2307/514; B32B 2307/724; B32B 2307/7248; B32B 2555/00; B32B 2555/02; B29C 47/0064; B29C 47/06; B29C 47/065; B29C 47/067; B29C 55/08; B29C 48/0018; B29C 48/21; B29C 55/18; B29C 71/02; B29C 2071/025; B29C 2071/022; B29C 48/08; B29C 48/914; B29C 48/9155; B29C 48/916; B29C 48/9165; B29C 48/917; B29C 55/14; B29C 55/146; B29K 2105/16; B29K 2509/02; B29K 2023/00; B29K 2509/00; B29K 2105/041; B29L 2007/008; B29L 2009/00

See application file for complete search history.

(56) References Cited

U.S. PATENT DOCUMENTS

| | | | |
|---|---|---|---|
| 3,745,057 A | 7/1973 | Loft et al. | |
| 3,843,761 A | 10/1974 | Bierenbaum et al. | |
| 4,116,892 A * | 9/1978 | Schwarz | B29C 55/18 |
| | | | 26/99 |
| 4,517,714 A * | 5/1985 | Sneed | D04H 1/00 |
| | | | 264/DIG. 47 |
| 4,632,869 A * | 12/1986 | Park | B32B 27/20 |
| | | | 428/315.5 |
| 4,636,869 A | 1/1987 | Tomohisa | |
| 4,704,238 A | 11/1987 | Okuyama | |
| 4,758,462 A * | 7/1988 | Park | B32B 27/20 |
| | | | 428/213 |
| 4,874,567 A | 10/1989 | Lopatin | |
| 5,028,289 A * | 7/1991 | Rasmussen | B29C 55/023 |
| | | | 156/229 |
| 5,110,530 A | 5/1992 | Havens | |
| 5,164,258 A | 11/1992 | Shida | |
| 5,558,930 A * | 9/1996 | DiPoto | B32B 27/08 |
| | | | 428/216 |
| 5,851,937 A * | 12/1998 | Wu | B29C 55/023 |
| | | | 442/394 |
| 6,033,771 A * | 3/2000 | Heffelfinger | B29C 47/0021 |
| | | | 264/173.14 |
| 6,045,900 A | 4/2000 | Haffner | |
| 6,156,421 A | 12/2000 | Stopper | |
| 6,638,636 B2 | 10/2003 | Tucker | |
| 6,676,871 B1 | 1/2004 | Benassi | |
| 8,603,609 B2 | 12/2013 | Fraser | |
| 8,734,016 B2 | 5/2014 | Borchardt | |
| 8,794,835 B2 | 8/2014 | Wilcoxen | |
| 8,865,289 B2 | 10/2014 | Borchardt | |
| 8,865,294 B2 * | 10/2014 | Cisek | B32B 3/30 |
| | | | 428/195.1 |
| 8,876,382 B2 | 11/2014 | Wilcoxen | |
| 8,888,365 B2 | 11/2014 | Fraser | |
| 8,940,377 B2 | 1/2015 | Fraser | |
| 9,016,945 B2 | 4/2015 | Fraser | |
| 9,028,386 B2 | 5/2015 | Fraser | |
| 9,050,783 B2 | 6/2015 | Borchardt | |
| 9,108,390 B2 | 8/2015 | Borchardt | |
| 9,114,596 B2 | 8/2015 | MacPherson | |
| 9,132,956 B2 | 9/2015 | Wilcoxen | |
| 9,186,862 B2 | 11/2015 | Broering | |
| 9,216,538 B2 | 12/2015 | Borchardt | |
| D748,990 S | 2/2016 | Broering | |
| 9,260,224 B2 | 2/2016 | Borchardt | |
| D750,404 S | 3/2016 | Broering | |
| D750,499 S | 3/2016 | Broering | |
| 9,365,324 B2 | 6/2016 | Wilcoxen | |
| 9,381,697 B2 | 7/2016 | Dorsey | |
| 9,381,718 B2 | 7/2016 | Dorsey | |
| 9,387,618 B2 | 7/2016 | Borchardt | |
| 9,393,757 B2 | 7/2016 | Borchardt | |
| D762,483 S | 8/2016 | Broering | |
| 9,469,441 B2 | 10/2016 | Borchardt | |
| 9,469,443 B2 | 10/2016 | Hoying | |
| 9,486,977 B2 | 11/2016 | Broering | |
| 9,492,332 B2 | 11/2016 | Cancio | |
| 9,522,498 B2 | 12/2016 | Borchardt | |
| 9,522,768 B2 | 12/2016 | Wilcoxen | |

(56) References Cited

U.S. PATENT DOCUMENTS

| | | | |
|---|---|---|---|
| 9,566,760 | B2 | 2/2017 | Borchardt |
| 9,573,729 | B2* | 2/2017 | Cobler .................. B65D 31/02 |
| 9,604,429 | B2 | 3/2017 | Borchardt |
| 9,637,278 | B2 | 5/2017 | Borchardt |
| 9,669,595 | B2 | 6/2017 | Borchardt |
| 9,682,801 | B2 | 6/2017 | Borchardt |
| 9,731,475 | B2 | 8/2017 | Wilcoxen |
| 9,744,706 | B2 | 8/2017 | Borchardt |
| 9,790,012 | B2 | 10/2017 | Bergman |
| 9,862,177 | B2 | 1/2018 | MacPherson |
| D811,895 | S | 3/2018 | Borchardt |
| D811,897 | S | 3/2018 | Cisek et al. |
| D811,898 | S | 3/2018 | Pszczolkowski |
| D811,899 | S | 3/2018 | Kuhl |
| D811,900 | S | 3/2018 | Borchardt |
| D812,492 | S | 3/2018 | Cisek et al. |
| D813,054 | S | 3/2018 | Pszczolkowski |
| D814,940 | S | 4/2018 | Pszczolkowski |
| D815,958 | S | 4/2018 | Borchardt |
| 9,950,489 | B2 | 4/2018 | Fraser |
| 9,950,841 | B2 | 4/2018 | Fraser |
| D817,779 | S | 5/2018 | Pszczolkowski |
| 9,981,456 | B2 | 5/2018 | Broering |
| 10,029,437 | B2 | 7/2018 | Borchardt |
| 10,046,508 | B2 | 8/2018 | Dorsey |
| 10,052,844 | B2 | 8/2018 | Dorsey |
| 10,081,169 | B2 | 9/2018 | Broering |
| 10,167,165 | B2 | 1/2019 | Binger |
| 10,196,176 | B2 | 2/2019 | Fraser |
| 10,196,177 | B2 | 2/2019 | Borchardt |
| D842,706 | S | 3/2019 | Pszczolkowski |
| 2002/0074691 | A1* | 6/2002 | Mortellite ........... B29C 47/0021 264/288.4 |
| 2002/0187361 | A1* | 12/2002 | Amon .................... B32B 27/32 428/516 |
| 2003/0035943 | A1* | 2/2003 | Jones ..................... B32B 27/32 428/317.9 |
| 2003/0039851 | A1 | 2/2003 | Hale |
| 2003/0077471 | A1 | 4/2003 | Tucker |
| 2003/0082392 | A1* | 5/2003 | Bader ................ B29C 47/0021 428/515 |
| 2003/0168776 | A1 | 9/2003 | Brady |
| 2003/0213549 | A1* | 11/2003 | McAmish ............ B29C 55/023 156/229 |
| 2004/0157333 | A1* | 8/2004 | McAmish ............ G01N 15/08 436/5 |
| 2004/0209070 | A1* | 10/2004 | Sheppard ............... B32B 27/18 428/327 |
| 2005/0086465 | A1 | 4/2005 | Sapkota |
| 2005/0110713 | A1 | 5/2005 | Chung |
| 2005/0248051 | A1* | 11/2005 | Cancio .................. B29C 55/06 264/154 |
| 2006/0024518 | A1* | 2/2006 | Kong ..................... B32B 3/26 428/500 |
| 2006/0024520 | A1 | 2/2006 | Kong |
| 2006/0147716 | A1* | 7/2006 | Braverman ....... A61F 13/51401 428/411.1 |
| 2006/0148361 | A1 | 7/2006 | Ng |
| 2006/0228504 | A1* | 10/2006 | Wilkie ..................... B32B 7/02 428/35.7 |
| 2006/0269710 | A1* | 11/2006 | Inglis ..................... B32B 1/08 428/35.7 |
| 2007/0020448 | A1* | 1/2007 | Hubbard .............. B29C 55/023 428/304.4 |
| 2007/0237924 | A1* | 10/2007 | Bruce ................. A61F 13/4902 428/137 |
| 2008/0205800 | A1* | 8/2008 | Su ...................... B29C 47/0021 383/109 |
| 2008/0233375 | A1* | 9/2008 | Wright .................... C08J 5/18 428/219 |
| 2009/0029114 | A1* | 1/2009 | Cancio .................. B29C 55/06 428/174 |
| 2009/0252902 | A1* | 10/2009 | Bender .................. B32B 27/08 428/32.22 |
| 2010/0040875 | A1* | 2/2010 | Patel ..................... B29C 55/18 428/338 |
| 2010/0076390 | A1* | 3/2010 | Norrby ............... A61F 13/4902 604/367 |
| 2010/0098354 | A1 | 4/2010 | Fraser |
| 2010/0216963 | A1 | 8/2010 | Ueda |
| 2010/0285286 | A1* | 11/2010 | Middlesworth ..... A61F 13/4902 428/196 |
| 2011/0039083 | A1* | 2/2011 | Chen ..................... B32B 27/08 428/219 |
| 2011/0052104 | A1 | 3/2011 | Wilcoxen |
| 2011/0052105 | A1* | 3/2011 | Wilcoxen ............... B65D 33/28 383/75 |
| 2011/0117307 | A1 | 5/2011 | Fraser |
| 2011/0195259 | A1* | 8/2011 | Song ................... B29C 47/0021 428/447 |
| 2011/0218316 | A1* | 9/2011 | Drysdale ............. C08G 63/6826 528/299 |
| 2012/0012633 | A1 | 1/2012 | Wilcoxen |
| 2012/0033900 | A1* | 2/2012 | Fraser ..................... B32B 7/02 383/105 |
| 2012/0039550 | A1 | 2/2012 | MacPherson |
| 2012/0063704 | A1 | 3/2012 | Hoying |
| 2012/0063706 | A1* | 3/2012 | Fraser .................... B29C 65/56 383/109 |
| 2012/0064271 | A1 | 3/2012 | Broering |
| 2012/0088645 | A1 | 4/2012 | Fraser |
| 2012/0134606 | A1 | 5/2012 | Borchardt |
| 2012/0135256 | A1* | 5/2012 | Donovan ............ B29B 17/0005 428/515 |
| 2012/0163738 | A1 | 6/2012 | Borchardt |
| 2012/0214657 | A1 | 8/2012 | Fraser |
| 2012/0237743 | A1 | 9/2012 | O'Donnell |
| 2012/0258307 | A1* | 10/2012 | Cretekos ............... B29C 55/023 428/341 |
| 2012/0269465 | A1* | 10/2012 | Dorsey .................. B29C 55/06 383/105 |
| 2012/0269466 | A1* | 10/2012 | Dorsey .................. B65D 31/02 383/109 |
| 2012/0282476 | A1* | 11/2012 | Lu .......................... B32B 15/08 428/461 |
| 2012/0308789 | A1* | 12/2012 | Lockhart ............. B29C 47/0004 428/203 |
| 2013/0028542 | A1* | 1/2013 | Borchardt ............... B29C 55/06 383/119 |
| 2013/0029066 | A1 | 1/2013 | Borchardt |
| 2013/0046069 | A1* | 2/2013 | Meyer ................. B29C 47/0021 526/317.1 |
| 2013/0086874 | A1 | 4/2013 | Liestman |
| 2013/0094788 | A1 | 4/2013 | Wilcoxen |
| 2013/0115396 | A1 | 5/2013 | Borchardt |
| 2013/0140207 | A1 | 6/2013 | Wilcoxen |
| 2013/0202853 | A1* | 8/2013 | Bergman ................ B29C 55/18 428/167 |
| 2013/0209711 | A1 | 8/2013 | Borchardt |
| 2013/0209712 | A1 | 8/2013 | Borchardt |
| 2013/0243982 | A1 | 9/2013 | Borchardt |
| 2013/0259408 | A1 | 10/2013 | Borchardt |
| 2013/0295395 | A1* | 11/2013 | Paulino ................... C08L 23/12 428/461 |
| 2014/0023829 | A1 | 1/2014 | Broering |
| 2014/0119679 | A1 | 5/2014 | Cisek |
| 2014/0174631 | A1 | 6/2014 | Borchardt |
| 2014/0178649 | A1 | 6/2014 | Borchardt |
| 2014/0334749 | A1 | 11/2014 | Borchardt |
| 2014/0367885 | A1 | 12/2014 | Borchardt |
| 2014/0378286 | A1 | 12/2014 | Borchardt |
| 2015/0003757 | A1 | 1/2015 | Wilcoxen |
| 2015/0010251 | A1 | 1/2015 | Wilcoxen |
| 2015/0030266 | A1 | 1/2015 | Borchardt |
| 2015/0036951 | A1 | 2/2015 | Fraser |
| 2015/0071574 | A1 | 3/2015 | Fraser |
| 2015/0190979 | A1 | 7/2015 | Fraser |
| 2015/0240000 | A1 | 8/2015 | Wang |
| 2015/0298862 | A1 | 10/2015 | Borchardt |

(56) References Cited

U.S. PATENT DOCUMENTS

| | | | |
|---|---|---|---|
| 2015/0321461 A1 | 11/2015 | MacPherson | |
| 2016/0016751 A1 | 1/2016 | Binger | |
| 2016/0039169 A1 | 2/2016 | Broering | |
| 2016/0046110 A1 | 2/2016 | Broering | |
| 2016/0059471 A1 | 3/2016 | Borchardt | |
| 2016/0067907 A1 | 3/2016 | Borchardt | |
| 2016/0114071 A1 | 4/2016 | Topolkaraev | |
| 2016/0194128 A1 | 7/2016 | Bergman | |
| 2016/0271864 A1 | 9/2016 | Dorsey | |
| 2016/0271902 A1 | 9/2016 | Dorsey | |
| 2016/0361903 A1* | 12/2016 | Bender | B32B 27/08 |
| 2017/0015821 A1* | 1/2017 | Dou | B32B 27/322 |
| 2017/0080622 A1 | 3/2017 | Borchardt | |
| 2017/0080623 A1 | 3/2017 | Borchardt | |
| 2017/0305104 A1 | 10/2017 | Wilcoxen | |
| 2017/0361566 A1 | 12/2017 | Borchardt | |
| 2018/0194099 A1 | 7/2018 | Wilcoxen | |
| 2018/0244433 A1 | 8/2018 | Borchardt | |
| 2019/0091966 A1 | 3/2019 | Wilcoxen | |

FOREIGN PATENT DOCUMENTS

| | | |
|---|---|---|
| CN | 1976797 A | 6/2007 |
| EP | 0283200 | 9/1988 |
| EP | 283200 A2 | 9/1988 |
| EP | 1423275 | 6/2004 |
| EP | 1423275 A1 | 6/2004 |
| EP | 1423275 B1 | 6/2004 |
| JP | 04309546 | 11/1992 |
| JP | 664080 A | 3/1994 |
| JP | H0959408 | 3/1997 |
| JP | 2005513960 A | 5/2005 |
| JP | 2005525247 A | 8/2005 |
| JP | 2007045046 A | 2/2007 |
| JP | 2007503326 | 2/2007 |
| JP | 2007536110 | 12/2007 |
| JP | 2011514391 | 5/2011 |
| KR | 1020070007893 | 1/2007 |
| WO | 9805501 | 2/1998 |
| WO | 9805502 | 2/1998 |
| WO | 9922930 | 5/1999 |
| WO | 9933654 A1 | 7/1999 |
| WO | 0023509 A1 | 4/2000 |
| WO | 0151548 | 7/2001 |
| WO | 0151548 A2 | 7/2001 |
| WO | 2001047710 | 7/2001 |
| WO | 2001047710 A1 | 7/2001 |
| WO | 0158685 A1 | 8/2001 |
| WO | 2001058685 A1 | 8/2001 |
| WO | 03020513 A1 | 3/2003 |
| WO | 03035394 A1 | 5/2003 |
| WO | 2003035394 A1 | 5/2003 |
| WO | 2005021262 A1 | 3/2005 |
| WO | 2005110713 A1 | 11/2005 |
| WO | 2007022990 | 3/2007 |
| WO | 2010059448 A1 | 5/2010 |
| WO | 2011019504 | 2/2011 |
| WO | 2014199268 A1 | 12/2014 |
| WO | 2017011341 A1 | 1/2017 |

OTHER PUBLICATIONS

Gregory, B. H., Polyethylene Film Extrusion A Process Manual, pp. 102-103,215,2009, Trafford Publishing, USA.
Third-Party Submission in U.S. Appl. No. 15/206,072 submitted May 30, 2017, 25 pages.
International Search Report and Written Opinion dated May 8, 2017, 12 pages.
International (PCT) Search Report for PCT/US17/19594 dated May 30, 2017, 8 pages.
International (PCT) Search Report and Written Opinion for PCT App. No. PCT/US16/60006 dated Mar. 29, 2017,, 17 pages.
Columbian Office Action for Columbian App. No. NC2018/0000374 dated Jan. 31, 2018, 7 pages.
P.C. Wu et al., "Novel Microporous Films and their Composites," Journal of Engineered Fibers and Fabrics, vol. 2, Issue 1, 2007, 11 pages.
Omya International AG, Breathable Polyolefin Film, Review, Technical Information Plastics, R4-02, 2004, 4 pages.
D.L. Green et al., "Three-dimensional Pore Connectivity in Bi-axially Stretched Microporous Composite Membranes," Journal of Membrane Science, 279, 100-110, 2006, 11 pages.
CN, Second Office Action of State Intellectual Property Office (with English translation), Chinese Patent Application No. 2015800270287, 9 pages, dated Jan. 30, 2018.
Windmolier & Holscher Technical Data Sheet (2013), 2 pages.
U.S., Non-Final Office Action, U.S. Appl. No. 14/709,728, 17 pages (dated Apr. 22, 2016).
Admitted Prior Art—Product Data Sheet BR 124 (Clopay), 2 pages.
English Translation of Office Action dated Jun. 5, 2017 issued in corresponding Chinese Patent Application No. 201580027028.7 (received Aug. 24, 2017).
CN, English Translation of Search Report issued in corresponding Chinese Patent Application No. 2015800270287, 2 pages (dated May 26, 2017).
CN, Office Action, Chinese Application No. 2015800280287, 5 pages (dated Jun. 5, 2017).
U.S., Non-Final Office Action issued in parent U.S. Appl. No. 14/709,728, 17 pages (dated Apr. 22, 2016).
CO, English Translation of Office Action issued in corresponding Colombian Patent Application No. NC2016/0004872, 1 page (dated Dec. 24, 2016).
Extended European Search Report for European Pat. App. No. 181591215 dated Jun. 26, 2018, 11 pages.
Communication Pursuant to Article 94(3) EPC for European Patent App. No. 15724480.7 dated Jun. 18, 2018, 6 pages.
Chinese Decision of Rejection for Chinese App. No. 2015800270287 dated Oct. 11, 2018, 4 pages, (no English translation available).
English Translation of Chinese Decision of Rejection for Chinese App. No. 2015800270287 dated Oct. 11, 2018, 6 pages.
Indonesian Office Action for Indonesian Patent App. No. P-00201607612 dated Dec. 21, 2018, 5 pages.
Office Action dated Jan. 15, 2019 for U.S. Appl. No. 15/206,072, (pp. 1-13).
Australian Examination Report for Australian App. No. 2015259236 dated Feb. 26, 19, 3 pages.
Korean Preliminary Rejection for Korean App. No. 10-2016-7034770 dated Jan. 21, 2019, 15 pages.
European Extended Search Report for EP16824959.7 dated Feb. 19, 2019, 8 pages.
Notice of Decision for Egypt App. No. 1816/2016 dated Jan. 30, 2019, 13 pages.
Office Action dated Feb. 14, 2019 for U.S. Appl. No. 15/431,073, (pp. 1-15).
Office Action dated Feb. 14, 2019 for U.S. Appl. No. 15/876,483, (p. 1-9).
Office Action dated Dec. 11, 2018 for U.S. Appl. No. 15/442,867, (pp. 1-8).
Japanese Office Action for Japanese App. No. 2016-567675 dated Nov. 19, 2018, 11 pages.
Extended European Search Report for European App. No. 16862828.7 dated Mar. 29, 2019, 7 pages.
Indian First Examination Report for Indian App. No. 201627041571, dated Feb. 20, 2020, 5 pages.
Brazilian Search Report for Brazilian Patent App. BR112016025367-1 dated Dec. 5, 2019, 9 pages.
Canadian Office Action for Canadian Patent App. No. 3,004,264 dated Nov. 8, 2019, 3 pages.
Columbian Office Action for Columbian App. No. NC2018/0000374 dated Nov. 5, 2019, 31 pages.
European Communication pursuant to Art. 94(3) for EP16824959.7 dated Oct. 10, 2019, 4 pages.
Notice of Preliminary Rejection for Korean App. No. 10-2016-7034770 dated Nov. 28, 2019, 5 pages.
Office Action dated Jan. 15, 2020 for U.S. Appl. No. 15/700,282, (pp. 1-7).

(56) References Cited

OTHER PUBLICATIONS

Office Action dated Jan. 8, 2020 fo U.S. Appl. No. 15/431,073, 17 pages.
Saudi Arabian First Examination Report for Saudi Arabian App. No. 516380252, dated Jan. 28, 2020, 8 pages.
Office Action dated Feb. 4, 2020 for U.S. Appl. No. 15/442,867 (pp. 1-9).
Korean Final Office Action for Korean App. No. 10-2018-7015313 dated Dec. 23, 2019, 10 pages.
Chinese Patent Office Action for Chinese App. No. 201680077856.6 dated Dec. 4, 2019, 34 pages.
Australian Examination Report for Australian App. No. 2016350820 dated Jan. 8, 2020, 4 pages.
Office Action dated May 17, 2019 for U.S. Appl. No. 15/206,072, (pp. 1-12).
Canadian Office Action for Canadian App. No. 3,004,264 dated Apr. 9, 2019, 8 pages.
Australian First Examination Report for Australian App. No. 2016350820 dated May 24, 2019, 6 pages.
Office Action dated Jun. 5, 2019 for U.S. Appl. No. 15/442,867, 8 pages.
Columbian Office Action for Columbian App. No. NC2018/0000374 dated May 3, 2019, 35 pages.
Korean Office Action for Korean App. No. 10-2018-7015313 dated Jun. 25, 2019, 33 pages.
Japanese Office Action for Japanese App. No. 2018-522690 dated May 26, 2019, 14 pages.
Japanese Office Action for Japanese App. No. 2016-567675 dated Jul. 22, 2019, 11 pages.
Notice of Final Rejection for Korean App. No. 10-2016-7034770 dated Aug. 5, 2019, 7 pages.
Office Action dated Aug. 23, 2019 for U.S. Appl. No. 15/206,072, (pp. 1-16).
Notice of Opposition for AU2015259236 dated Aug. 27, 2019, 3 pages.
Columbian Office Action for Columbian App. No. NC2018/0000374 dated Sep. 24, 2019, 26 pages.
Australian Examination Report for Australian App. No. 2016293826 dated Mar. 31, 2020, BP-480 AU II, 3 pages.
Office Action dated Apr. 6, 2020, for U.S. Appl. No. 15/206,072, BP-480 US-U II (pp. 1-25).
Columbian Office Action for Columbian App. No. NC2018/0004912 dated Jan. 29, 2020, BP-480 CO II, 30 pages.
Statement of Grounds & Particulars of Opposition for Australian App. No. 2015259236 dated Nov. 22, 2019, 4 pages.
Evidence in Support of the Opposition for Australian App. No. 2015259236, dated Feb. 21, 2020, 505 pages.
Korean Final Office Action for Korean App. No. 10-2018-7015313 dated Mar. 5, 2020, BP-485 KR II, 10 pages.
Japanese Office Action for Japanese App. No. 2018-522690 dated Jan. 30, 2020, BP-485 JPII, 9 pages.
Brazilian Preliminary Examination Report for Brazilian Patent App. No. BR112018008995-8, dated Feb. 28, 2020, BP-485 BR II, 5 pages, (No English Translation available).
Chinese Reexamination Decision for Chinese App. No. 2015800270287 dated May 8, 2020, CLP-14009 CN II, 7 pages, (no English translation available).
Brazilian Preliminary Examination Report for Brazilian Patent App. No. BR112018000507-0 dated May 12, 2020, BP-480 BR II, 4 pages, (No English Translation).
English Translation of Chinese Reexamination Decision for Chinese App. No. 2015800270287 dated May 8, 2020, CLP-14009 CN II, 8 pages.
Chinese Office Action for Chinese App. No. 201680047601.5 dated May 27, 2020, BP-480 CN II, 8 pages.
Office Action dated May 21, 2020 for U.S. Appl. No. 15/700,282 (pp. 1-8).

* cited by examiner

POLYMERIC FILMS AND METHODS FOR MAKING POLYMERIC FILMS

PRIORITY CLAIM

This application claims priority under 35 U.S.C. § 119(e) to U.S. Provisional Application Ser. No. 62/251,415, filed Nov. 5, 2015, which is expressly incorporated by reference herein.

BACKGROUND

The present disclosure relates to polymeric materials, and particularly to polymeric films. More particularly, the present disclosure relates to multi-layer polymeric films having a microporous core layer formed from polymeric material and filler.

SUMMARY

According to the present disclosure, a multi-layer non-breathable film is made using a manufacturing process. The manufacturing process comprises the steps of extruding a composition to form a molten web, casting the molten web to form a quenched film, and stretching the quenched film to form the microporous breathable film.

In illustrative embodiments, two or more extrudable materials are co-extruded to form the molten web. The quenched film is formed from the molten web by casting the molten web against a surface of a chill roll using a vacuum box and/or blowing air (e.g., an air knife and/or an air blanket).

In illustrative embodiments, a multi-layer film in accordance with the present disclosure comprises at least one cavitated core layer and at least one non-cavitated skin layer. The at least one cavitated core layer is microporous and breathable. The at least one non-cavitated skin layer is non-microporous and non-breathable.

In illustrative embodiments, a multi-layer non-breathable film in accordance with the present disclosure comprises first and second non-cavitated skin layers, at least one cavitated core layer disposed between the first and second non-cavitated skin layers, and at least one polar polymer layer disposed between the first and second non-cavitated skin layers. The at least one polar polymer layer comprises a hygroscopic polymer.

In illustrative embodiments, a partially breathable multi-layer film in accordance with the present disclosure comprises at least one cavitated core layer and at least one skin layer having one or a plurality of discontinuities therein. The multi-layer film includes at least one microporous breathable region and at least one non-microporous non-breathable region.

In illustrative embodiments, a personal hygiene product comprises at least one inner multi-layer film in accordance with the present disclosure and at least one outer non-woven layer. At least a portion of a non-cavitated skin layer of the inner multi-layer film is bonded to at least a portion of the outer non-woven layer.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
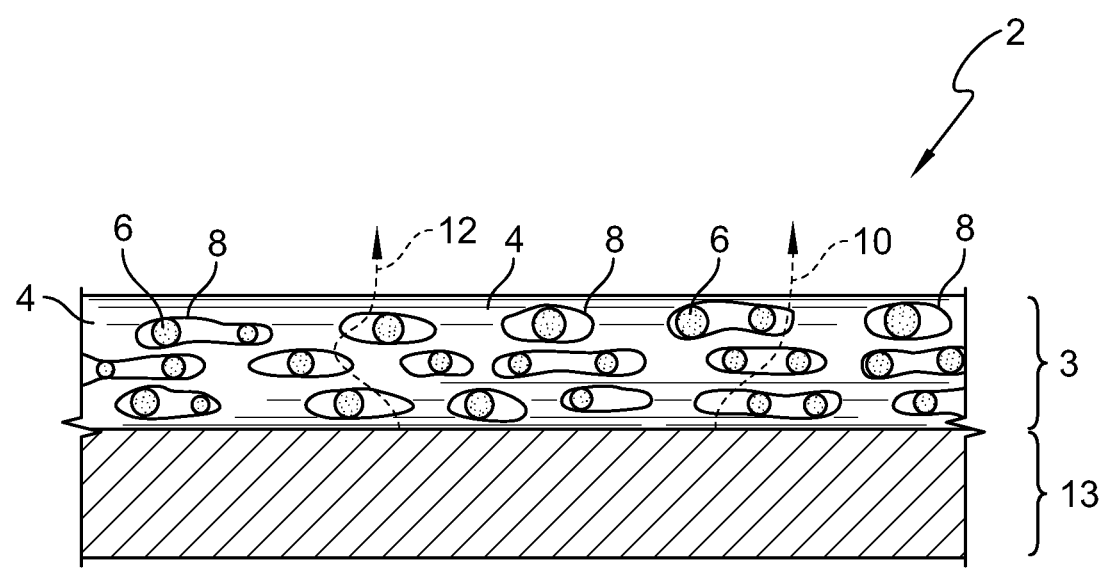
FIG. 1 is a diagrammatic view of a representative embodiment of a multi-layer film that includes two layers.

A first embodiment of a multi-layer film 2 in accordance with the present disclosure is shown, for example, in FIG. 1. The multi-layer film 2 includes a cavitated core layer 3 and a non-cavitated skin layer 13. The cavitated core layer 3 includes a thermoplastic polymer 4 and a solid filler 6 dispersed in the thermoplastic polymer 4. In some embodiments, the cavitated core layer 3 includes a combination of two or more thermoplastic polymers 4 and/or a combination of two or more solid fillers 6. The non-cavitated skin layer 13 contains a thermoplastic polymer (e.g., which may be the same as or different than the thermoplastic polymer 4 in the cavitated core layer 3). In some embodiments, the non-cavitated skin layer 13 includes a combination of two or more thermoplastic polymers 4.

As shown in FIG. 1, the cavitated core layer 3 includes an interconnected network of micropores 8 formed in the thermoplastic polymer resin 4. On average, the micropores 8 are smaller in size than the size of a typical water droplet but larger in size than a water vapor molecule. As a result, the micropores 8 permit the passage of water vapor but minimize or block the passage of liquid water. Two representative pathways for the transmission of water vapor through the cavitated core layer 3 are shown by the dashed lines 10 and 12 in FIG. 1.

A precursor film containing at least one cavitated core layer 3 (e.g., containing a thermoplastic polymer 4 and a solid filler 6 dispersed in the thermoplastic polymer 4) and at least one non-cavitated skin layer 13 (e.g., containing a thermoplastic polymer 4) may be produced by either a cast film process or a blown film process. The film thus produced may then be stretched by one or more stretching processes. The stretching process moves (e.g., pulls) polymeric material away from the surface of solid filler dispersed therein, thereby forming the micropores 8.

Figure 2:
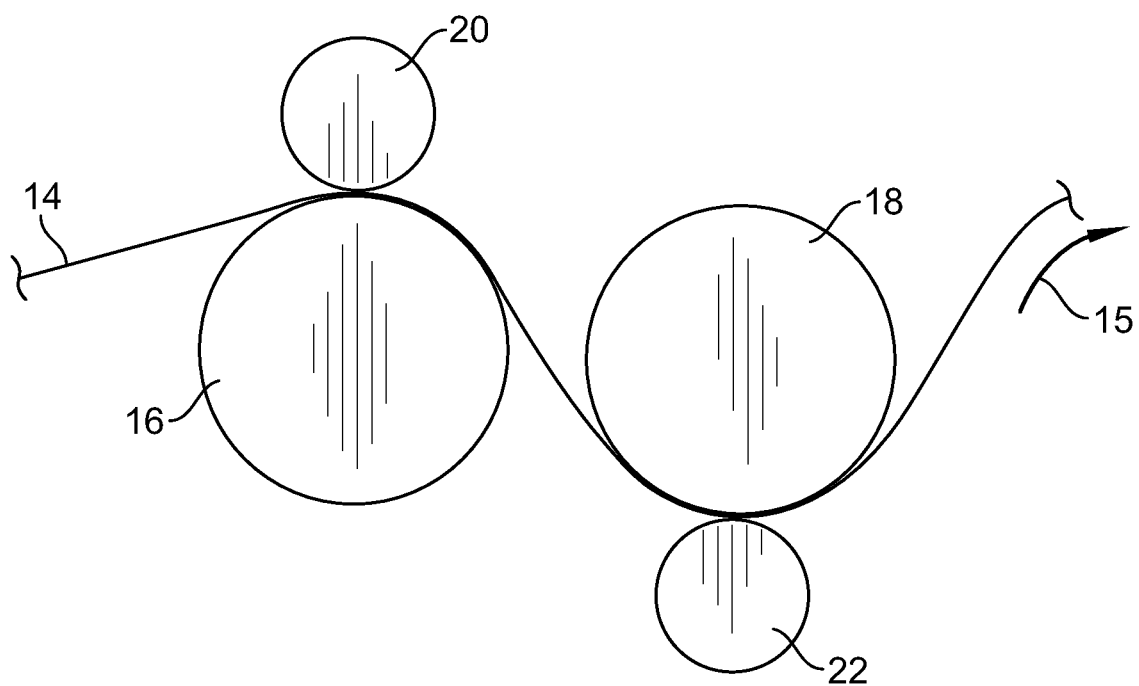
FIG. 2 is a diagrammatic view of an exemplary process for machine direction (MD) stretching of a polymeric film.

In one example, stretching may be achieved via machine direction (MD) orientation by a process analogous to that shown in simplified schematic form in FIG. 2. For example, the film 14 shown in FIG. 2 may be passed between at least two pairs of rollers in the direction of an arrow 15. In this example, first roller 16 and a first nip 20 run at a slower speed ($V_1$) than the speed ($V_2$) of a second roller 18 and a second nip 22. The ratio of $V_2/V_1$ determines the degree to which the film 14 is stretched. Since there may be enough drag on the roll surface to prevent slippage, the process may alternatively be run with the nips open. Thus, in the process shown in FIG. 2, the first nip 20 and the second nip 22 are optional.

Figure 3:
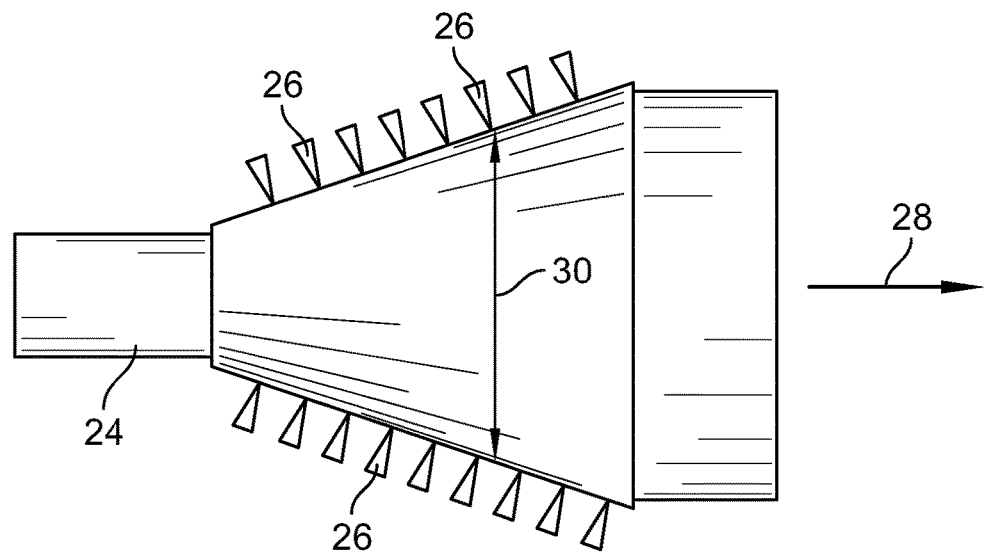
FIG. 3 is a diagrammatic view of an exemplary process for cross-directional (CD) stretching of a polymeric film.

In another example, stretching may be achieved via transverse or cross-directional (CD) stretching by a process analogous to that shown in simplified schematic form in FIG. 3. For example, the film 24 shown in FIG. 3 may be moved in the direction of the arrow 28 while being stretched sideways on a tenter frame in the directions of doubled-headed arrow 30. The tenter frame includes a plurality of attachment mechanisms 26 configured for gripping the film 24 along its side edges.

Figure 4:
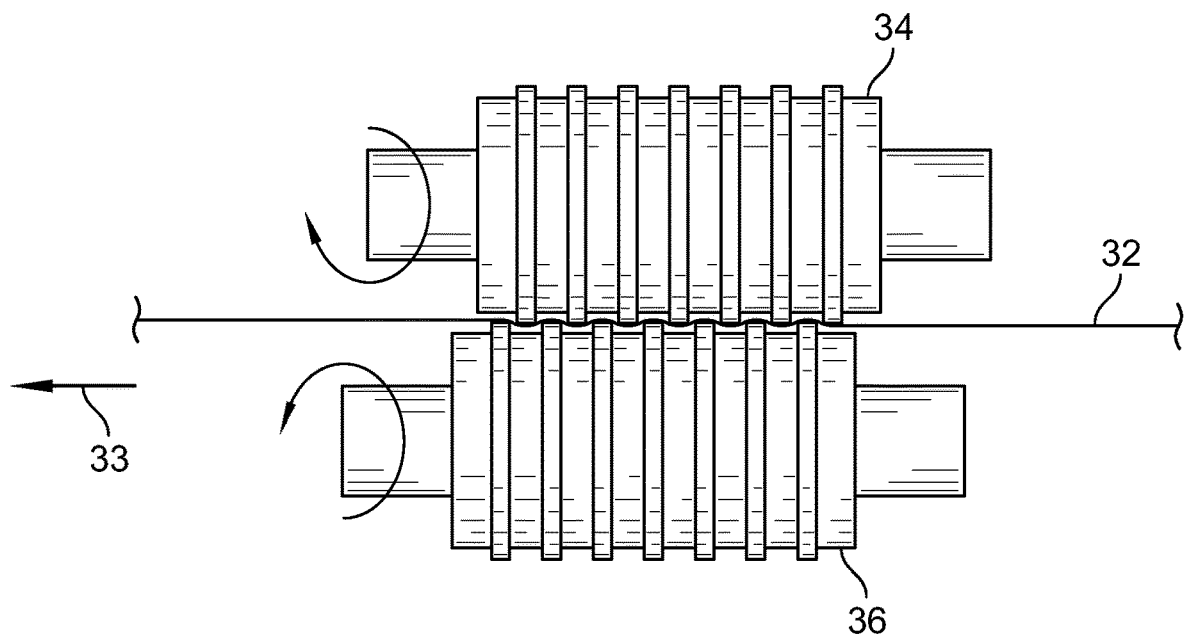
FIG. 4 is a diagrammatic view of an exemplary process for intermeshing gears (IMG) stretching of a polymeric film.

In a further example, stretching may be achieved via intermeshing gears (IMG) stretching by a process analogous to the one shown in simplified schematic form in FIG. 4. For example, a film 32 may be moved between a pair of grooved or toothed rollers as shown in FIG. 4 in the direction of arrow 33. In one example, the first toothed roller 34 may be rotated in a clockwise direction while the second toothed roller 36 may be rotated in a counterclockwise direction. At each point at which one or more teeth of the rollers 34 and 36 contact the film 32, localized stresses may be applied that stretch the film 32 and introduce interconnecting micropores therein analogous to the micropores 8 shown in FIG. 1. By the use of IMG stretching, the film 32 may be stretched in the machine direction (MD), the cross direction (CD), at oblique angles to the MD, or in any combination thereof.

A precursor film containing at least one cavitated core layer 3 (e.g., containing a thermoplastic polymer 4 and a solid filler 6 dispersed in the thermoplastic polymer 4) and at least one non-cavitated skin layer 13 (e.g., containing a thermoplastic polymer 4) may be stretched to form a multi-layer film 2 in accordance with the present disclosure. The precursor film may be prepared by mixing together the thermoplastic polymer 4 (or a combination of thermoplastic polymers 4), the solid filler 6 (or a combination of solid fillers 6), and any optional components until blended, heating the mixture, and then co-extruding the heated mixture with at least one additional extrudable material to form a molten web. The at least one additional extrudable material may contain a thermoplastic polymer 4 (or a combination of thermoplastic polymers 4). A suitable film-forming process may be used to form a precursor film en route to forming a multi-layer film. For example, the precursor film may be manufactured by casting or extrusion using blown-film, co-extrusion, or single-layer extrusion techniques and/or the like. In one example, the precursor film may be wound onto a winder roll for subsequent stretching in accordance with the present disclosure. In another example, the precursor film may be manufactured in-line with a film stretching apparatus such as shown in one or more of FIGS. 2-4.

In addition to containing one or more thermoplastic polymers and one or more solid fillers, the precursor film may also contain other optional components to improve the film properties or processing of the film. Representative optional components include but are not limited to anti-oxidants (e.g., added to prevent polymer degradation and/or to reduce the tendency of the film to discolor over time) and processing aids (e.g., added to facilitate extrusion of the precursor film). In one example, the amount of one or more anti-oxidants in the precursor film is less than about 1% by weight of the film and the amount of one or more processing aids is less than about 5% by weight of the film. Additional optional additives include but are not limited to whitening agents (e.g., titanium dioxide), which may be added to increase the opacity of the film. In one example, the amount of one or more whitening agents is less than about 10% by weight of the film. Further optional components include but are not limited to antiblocking agents (e.g., diatomaceous earth) and slip agents (e.g. erucamide a.k.a. erucylamide), which may be added to allow film rolls to unwind properly and to facilitate secondary processing (e.g., diaper making). In one example, the amount of one or more antiblocking agents and/or one or more slip agents is less than about 5% by weight of the film. Further additional optional additives include but are not limited to scents, deodorizers, pigments other than white, noise reducing agents, and/or the like, and combinations thereof. In one example, the amount of one or more scents, deodorizers, pigments other than white, and/or noise reducing agents is less than about 10% by weight of the film.

Prior to stretching, the precursor film may have an initial basis weight of less than about 100 grams per square meter (gsm). In one example, the precursor film has an initial basis weight of less than about 75 gsm.

In one example, a multi-layer film 2 in accordance with the present disclosure is formed via a blown film process. In another example, a multi-layer film 2 in accordance with the present disclosure is formed via a cast film process. The cast film process involves the extrusion of molten polymers through an extrusion die to form a thin film. The film is pinned to the surface of a chill roll with an air knife, an air blanket, and/or a vacuum box.

In illustrative embodiments, a process for making a multi-layer film 2 in accordance with the present disclosure includes (a) extruding two or more extrudable materials to form a molten web, wherein at least one of the two or more extrudable materials comprises a first polyolefin and an inorganic filler, and at least another of the two or more extrudable materials comprises a second polyolefin, (b) casting the molten web against a surface of a chill roll using an air knife, an air blanket, a vacuum box, or a combination thereof to form a quenched film, and (c) stretching the quenched film to form the multi-layer film 2. The first olefin and the second olefin may be the same or different.

It has been discovered that by using a vacuum box, blowing air (e.g., an air knife and/or an air blanket), or a vacuum box in combination with blowing air to cast the molten web against a chill roll in accordance with the present disclosure, a cavitated core layer 3 exhibiting surprisingly and unexpectedly improved properties as compared to other microporous breathable films may be prepared. As further described below, these properties may include reduced basis weight, increased strain at peak machine direction, increased tensile strength at peak machine direction, increased tensile strength at 5% strain machine direction, increased secant modulus machine direction (1%), increased Dart Impact Strength, and/or the like, and combinations thereof.

Figure 5:
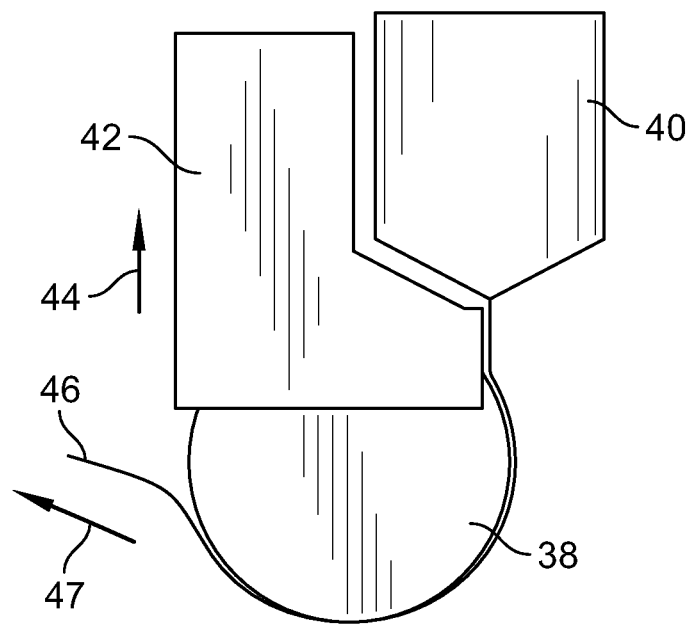
FIG. 5 is a diagrammatic view of an exemplary process for casting a molten web against a chill roll using a vacuum box.

In one example, the molten web is cast against the surface of the chill roll under negative pressure using a vacuum box as shown in simplified schematic form in FIG. 5. A vacuum box works by evacuating air between the film and the surface of the chill roll. For example, as shown in FIG. 5, a film 46 is extruded from an extrusion die 40 in the direction of arrow 47 and quenched from the molten state with a vacuum box 42. The vacuum box 42 draws a vacuum behind the molten web 46 in the direction of arrow 44 to draw the film 46 down onto the chill roll 38. The vacuum drawn in the direction of arrow 44 removes the entrained air between the surface of the chill roll 38 and the film 46. The vacuum box process is not subject to draw resonance for high molecular weight polymers that would tend to extrude unstable thickness in a nipped quench process due to the draw resonance phenomenon.

When a vacuum box 42 is used, the molten polymer may exit the die 40 and hit the chill roll 38 within a smaller distance than in an embossed process. For example, in some embodiments, the melt curtain is configured to hit the chill roll 38 within a distance of less than about 12 inches, 11 inches, 10 inches, 9 inches, 8 inches, 7 inches, 6 inches, 5 inches, 4 inches, 3, inches, 2 inches, or 1 inch. In illustrative embodiments, the melt curtain is configured to exit the die and hit the roll within a distance of less than about 3 inches and, in some examples, within a distance of about or less than 1 inch. One advantage of reducing the distance between the die 40 and the roll surface 38 as compared to in a nipped quench process is that smaller distances are less susceptible to the phenomenon of neck-in. Neck-in refers to a reduction in width of the molten web that occurs as the web leaves the die. By drawing the film 46 onto a surface of the chill roll 38 over a short distance as shown in FIG. 5, the vacuum box 42 may enhance web cooling, facilitate higher line speeds, reduce film neck-in, and/or reduce drag at the lip exit.

Figure 6:
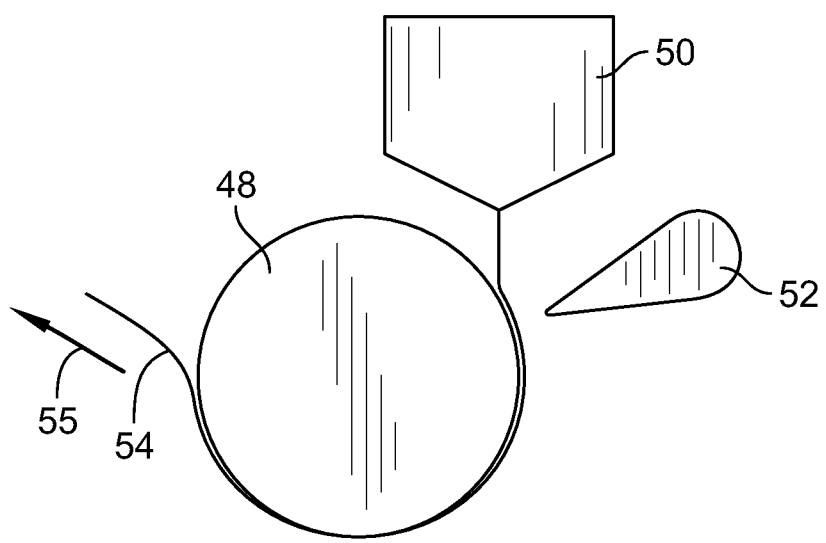
FIG. 6 is a diagrammatic view of an exemplary process for casting a molten web against a chill roll using an air knife.

In another example, the molten web is cast against the surface of the chill roll under positive pressure using an air knife or air blanket, as shown in simplified schematic form in FIG. 6. An air knife works to promote web quenching by gently blowing a high-velocity, low-volume air curtain over the molten film, thereby pinning the molten film to the chill roll for solidification. For example, as shown in FIG. 6, a film 54 is extruded from an extrusion die 50 in the direction of arrow 55 and quenched from the molten state with an air knife 52 blowing an air curtain over the molten film 54, thereby pinning the molten web 54 against a surface of the chill roll 48. An air blanket (also called a soft box) works similarly to an air knife and promotes web quenching by gently blowing an air curtain over the molten film. However, in the case of an air blanket, the air curtain is low velocity and high volume.

In a further example, the molten web is cast against the surface of the chill roll under a combination of negative pressure from a vacuum box, as shown in FIG. 5, and positive pressure from an air knife, as shown in FIG. 6. In illustrative embodiments, in the casting of the molten web against a surface of the chill roll, an exit temperature of cooling fluid passing through the chill roll is between about 50 degrees Fahrenheit and about 130 degrees Fahrenheit and, in some examples, between about 75 degrees Fahrenheit and about 130 degrees Fahrenheit.

The thermoplastic polymer 4 (or combination of thermoplastic polymers 4) used to make a non-cavitated skin layer 13 and/or a cavitated core layer 3 of a multi-layer film 2 in accordance with the present disclosure is not restricted, and may include all manner of thermoplastic polymers. In illustrative embodiments, the thermoplastic polymer is a polyolefin, including but not limited to homopolymers, copolymers, terpolymers, and/or blends thereof.

Representative polyolefins that may be used in accordance with the present disclosure include but are not limited to low density polyethylene (LDPE), high density polyethylene (HDPE), linear low density polyethylene (LLDPE), ultra-low density polyethylene (ULDPE), polypropylene, ethylene-propylene copolymers, polymers made using a single-site catalyst, ethylene maleic anhydride copolymers (EMAs), ethylene vinyl acetate copolymers (EVAs), polymers made using Zeigler-Natta catalysts, styrene-containing block copolymers, and/or the like, and combinations thereof. Methods for manufacturing LDPE are described in *The Wiley Encyclopedia of Packaging Technology*, pp. 753-754 (Aaron L. Brody et al. eds., 2nd Ed. 1997) and in U.S. Pat. No. 5,399,426, both of which are incorporated by reference herein, except that in the event of any inconsistent disclosure or definition from the present specification, the disclosure or definition herein shall be deemed to prevail.

ULDPE may be produced by a variety of processes, including but not limited to gas phase, solution and slurry polymerization as described in *The Wiley Encyclopedia of Packaging Technology*, pp. 748-50 (Aaron L. Brody et al. eds., 2nd Ed. 1997), incorporated by reference above, except that in the event of any inconsistent disclosure or definition from the present specification, the disclosure or definition herein shall be deemed to prevail.

ULDPE may be manufactured using a Ziegler-Natta catalyst, although a number of other catalysts may also be used. For example, ULDPE may be manufactured with a metallocene catalyst. Alternatively, ULDPE may be manufactured with a catalyst that is a hybrid of a metallocene catalyst and a Ziegler-Natta catalyst. Methods for manufacturing ULDPE are also described in U.S. Pat. Nos. 5,399,426, 4,668,752, 3,058,963, 2,905,645, 2,862,917, and 2,699,457, each of which is incorporated by reference herein in its entirety, except that in the event of any inconsistent disclosure or definition from the present specification, the disclosure or definition herein shall be deemed to prevail. The density of ULDPE is achieved by copolymerizing ethylene with a sufficient amount of one or more monomers. In illustrative embodiments, the monomers are selected from 1-butene, 1-hexene, 4-methyl-1-pentene, 1-octene, and combinations thereof. Methods for manufacturing polypropylene are described in *Kirk-Othmer Concise Encyclopedia of Chemical Technology*, pp. 1420-1421 (Jacqueline I. Kroschwitz et al. eds., 4th Ed. 1999), which is incorporated herein by reference, except that in the event of any inconsistent disclosure or definition from the present specification, the disclosure or definition herein shall be deemed to prevail.

In illustrative embodiments, a polyolefin for use in accordance with the present disclosure includes polyethylene, polypropylene, or a combination thereof. In one example, the polyethylene includes linear low density polyethylene which, in some embodiments, includes a metallocene polyethylene. In another example, the polyethylene includes a combination of linear low density polyethylene and low density polyethylene. In a further example, the polyolefin consists essentially of only linear low density polyethylene.

In addition to thermoplastic polymer (e.g., polyolefin), an extrudable material to be extruded in accordance with the present disclosure may further include a solid filler. The solid filler is not restricted, and may include all manner of inorganic or organic materials that are (a) non-reactive with thermoplastic polymer, (b) configured for being uniformly blended and dispersed in the thermoplastic polymer, and (c) configured to promote a microporous structure within the film when the film is stretched. In illustrative embodiments, the solid filler includes an inorganic filler.

Representative inorganic fillers for use in accordance with the present disclosure include but are not limited to sodium carbonate, calcium carbonate, magnesium carbonate, barium sulfate, magnesium sulfate, aluminum sulfate, magnesium oxide, calcium oxide, alumina, mica, talc, silica, clay (e.g., non-swellable clay), glass spheres, titanium dioxide, aluminum hydroxide, zeolites, and a combination thereof. In illustrative embodiments, the inorganic filler includes an alkali metal carbonate, an alkaline earth metal carbonate, an alkali metal sulfate, an alkaline earth metal sulfate, or a combination thereof. In one example, the inorganic filler includes calcium carbonate.

In another example, the solid filler includes a polymer (e.g., high molecular weight high density polyethylene, polystyrene, nylon, blends thereof, and/or the like). The use of polymer fillers creates domains within the thermoplastic polymer matrix. These domains are small areas, which may be spherical, where only the polymer filler is present as compared to the remainder of the thermoplastic matrix where no polymer filler is present. As such, these domains act as particles.

The solid filler 6 provided in a composition to be extruded in accordance with the present disclosure may be used to produce micropores 8 of multi-layer film 2, as shown in FIG. 1. The dimensions of the solid filler 6 particles may be varied based on a desired end use (e.g., the desired properties of cavitated core layer 3). In one example, the average particle size of a solid filler particle ranges from about 0.1 microns to about 15 microns. In illustrative embodiments, the average particle size ranges from about 1 micron to about 5 microns and, in some examples, from about 1 micron to about 3 microns. The average particle size may be one of several different values or fall within one of several different ranges. For example, it is within the scope of the present disclosure to select an average particle size of the solid filler to be one of the following values: about 0.1 microns, 0.2 microns, 0.3 microns, 0.4 microns, 0.5 microns, 0.6 microns, 0.7 microns, 0.8 microns, 0.9 microns, 1.0 microns, 1.1 microns, 1.2 microns, 1.3 microns, 1.4 microns, 1.5 microns, 1.6 microns, 1.7 microns, 1.8 microns, 1.9 microns, 2.0 microns, 2.1 microns, 2.2 microns, 2.3 microns, 2.4 microns, 2.5 microns, 2.6 microns, 2.7 microns, 2.8 microns, 2.9 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns. 10.0 microns, 10.5 microns, 11.0 microns, 11.5 microns, 12.0 microns, 12.5 microns, 13.0 microns, 13.5 microns, 14.0 microns, 14.5 microns, or 15.0 microns.

It is also within the scope of the present disclosure for the average particle size of the solid filler 6 provided in a composition to be extruded in accordance with the present disclosure to fall within one of many different ranges. In a first set of ranges, the average particle size of the solid filler 6 is in one of the following ranges: about 0.1 microns to 15 microns, 0.1 microns to 14 microns, 0.1 microns to 13 microns, 0.1 microns to 12 microns, 0.1 microns to 11 microns, 0.1 microns to 10 microns, 0.1 microns to 9 microns, 0.1 microns to 8 microns, 0.1 microns to 7 microns, 0.1 microns to 6 microns, 0.1 microns to 5 microns, 0.1 microns to 4 microns, and 0.1 microns to 3 microns. In a second set of ranges, the average particle size of the solid filler 6 is in one of the following ranges: about 0.1 microns to 5 microns, 0.2 microns to 5 microns, 0.3 microns to 5 microns, 0.4 microns to 5 microns, 0.5 microns to 5 microns, 0.6 microns to 5 microns, 0.7 microns to 5 microns, 0.8 microns to 5 microns, 0.9 microns to 5 microns, and 1.0 microns to 5 microns. In a third set of ranges, the average particle size of the solid filler 6 is in one of the following ranges: about 0.1 microns to 4.9 microns, 0.2 microns to 4.8 microns, 0.3 microns to 4.7 microns, 0.4 microns to 4.6 microns, 0.5 microns to 4.5 microns, 0.6 microns to 4.4 microns, 0.7 microns to 4.3 microns, 0.8 microns to 4.2 microns, 0.9 microns to 4.1 microns, and 1.0 microns to 4.0 microns.

In illustrative embodiments, the amount of solid filler used in accordance with the present disclosure includes from about 30% by weight to about 75% by weight of the material to be extruded, quenched film formed from the extrusion of two or more extrudable materials, and/or multi-layer film formed from the quenched film. In further illustrative embodiments, the amount of solid filler used in accordance with the present disclosure includes from about 50% by weight to about 75% by weight of the material to be extruded, quenched film formed from the extrusion of two or more extrudable materials, and/or multi-layer film formed from the quenched film. Although amounts of filler outside this range may also be employed, an amount of solid filler that is less than about 30% by weight may not be sufficient to impart uniform breathability to a film. Conversely, amounts of filler greater than about 75% by weight may be difficult to blend with the polymer and may cause a loss in strength in the final film.

The amount of solid filler 6 may be varied based on a desired end use (e.g., the desired properties of the cavitated core layer 3). In one example, the amount of solid filler 6 ranges from about 40% to about 60% by weight of the material to be extruded, quenched film formed from the extrusion of the two or more extrudable materials, and/or multi-layer film formed from the quenched film. In another example, the amount of solid filler 6 ranges from about 45% to about 55% by weight of the material to be extruded, quenched film formed from the extrusion of the two or more extrudable materials, and/or multi-layer film formed from the quenched film. The amount of solid filler 6 may be one of several different values or fall within one of several different ranges. For example, it is within the scope of the present disclosure to select an amount of the solid filler 6 to be one of the following values: about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, or 75% by weight of the material to be extruded, quenched film formed from the extrusion of the two or more extrudable materials, and/or multi-layer film formed from the quenched film.

It is also within the scope of the present disclosure for the amount of the solid filler 6 to fall within one of many different ranges. In a first set of ranges, the amount of the solid filler 6 is in one of the following ranges: about 31% to 75%, 32% to 75%, 33% to 75%, 34% to 75%, 35% to 75%, 36% to 75%, 37% to 75%, 38% to 75%, 39% to 75%, 40% to 75%, 41% to 75%, 42% to 75%, 43% to 75%, 44% to 75%, and 45% to 75% by weight of the material to be extruded, quenched film formed from the extrusion of the two or more extrudable materials, and/or multi-layer film formed from the quenched film. In a second set of ranges, the amount of the solid filler is in one of the following ranges: about 30% to 74%, 30% to 73%, 30% to 72%, 30% to 71%, 30% to 70%, 30% to 69%, 30% to 68%, 30% to 67%, 30% to 66%, 30% to 65%, 30% to 64%, 30% to 63%, 30% to 62%, 30% to 61%, 30% to 60%, 30% to 59%, 30% to 58%, 30% to 57%, 30% to 56%, 30% to 55%, 30% to 54%, 30% to 53%, 30% to 52%, 30% to 51%, 30% to 50%, 30% to 49%, 30% to 48%, 30% to 47%, 30% to 46%, and 30% to 45% by weight of the material to be extruded, quenched film formed from the extrusion of the two or more extrudable materials, and/or multi-layer film formed from the quenched film. In a third set of ranges, the amount of the solid filler is in one of the following ranges: about 31% to 74%, 32% to 73%, 33% to 72%, 34% to 71%, 35% to 70%, 36% to 69%, 37% to 68%, 38% to 67%, 39% to 66%, 40% to 65%, 41% to 64%, 42% to 63%, 43% to 62%, 44% to 61%, 45% to 60%, 45% to 59%, 45% to 58%, 45% to 57%, 45% to 56%, and 45% to 55% by weight of the material to be extruded, quenched film formed from the extrusion of the two or more extrudable materials, and/or multi-layer film formed from the quenched film.

Although filler loading may be conveniently expressed in terms of weight percentages, the phenomenon of microporosity may alternatively be described in terms of volume percent of filler relative to total volume. By way of illustration, for calcium carbonate filler having a specific gravity of 2.7 g/cc and a polymer having a specific gravity of about 0.9, 35% by weight $CaCO_3$ corresponds to a filler loading of about 15% by volume $\{(0.35/2.7)/(0.65/0.9+0.35/2.7)\}$. Similarly, the 75 weight percent upper end of the range described above corresponds to about 56% by volume of $CaCO_3$. Thus, the amount of filler may be adjusted to provide comparable volume percentages for alternative solid fillers that have different (e.g., unusually low or high) specific gravities as compared to calcium carbonate.

In some embodiments, to render the solid filler particles free-flowing and to facilitate their dispersion in a polymeric material, the filler particles may be coated with a fatty acid and/or other suitable processing acid. Representative fatty acids for use in this context include but are not limited to stearic acid or longer chain fatty acids.

The type of stretching used to transform a quenched film into a multi-layer film 2 in accordance with the present disclosure is not restricted. All manner of stretching processes and combinations of stretching processes that are capable of moving (e.g., pulling) polymeric material 4 away from the surface of solid filler 6 dispersed therein in order to form micropores 8 in a cavitated core layer 3 are contemplated for use. In some examples, the stretching includes cross-directional stretching. In other examples, the stretching includes CD-IMG stretching. In further examples, the stretching includes MD stretching. In still further examples, the stretching includes MD IMG stretching. In additional examples, the stretching includes cold draw. In some embodiments, the stretching includes a combination of two or more different types of stretching including but not limited to MD stretching, CD IMG stretching, MD IMG stretching, cold draw, and/or the like. In some examples, the stretching includes a combination of CD IMG stretching and cold draw (which, in some embodiments, is performed subsequently to the CD IMG stretching). In illustrative embodiments, the stretching includes CD-IMG stretching followed by downweb MD stretching.

In illustrative embodiments, the type of stretching used to transform a quenched film into a multi-layer film 2 in accordance with the present disclosure includes CD IMG stretching. In addition, in illustrative embodiments, at least a portion of the stretching is performed at a temperature above ambient temperature. In one example, at least a portion of the stretching is performed at a temperature of between about 60 degrees Fahrenheit and about 200 degrees Fahrenheit.

In illustrative embodiments, a process for making a multi-layer film 2 in accordance with the present disclosure further includes annealing the multi-layer film 2. In one example, the annealing is performed at a temperature of between about 75 degrees Fahrenheit and about 225 degrees Fahrenheit.

In illustrative embodiments, as noted above, a multi-layer film 2 prepared in accordance with the present disclosure (e.g., by using a vacuum box and/or air knife to cast a molten web against a chill roll) may have reduced basis weight, increased tensile strength at peak machine direction, increased tensile strength at 5% strain machine direction, increased secant modulus machine direction (1%), and/or increased Dart Impact Strength as compared to conventional multi-layer films containing a microporous breathable layer.

The basis weight of a multi-layer film 2 in accordance with the present disclosure may be varied based on a desired end use (e.g., the desired properties and/or applications of the multi-layer film 2). In one example, the basis weight ranges from about 5 gsm to about 30 gsm. In another example, the basis weight ranges from about 6 gsm to about 25 gsm. In illustrative embodiments, the basis weight is less than about 14 gsm and, in some examples, less than about 12 gsm. Although basis weights outside this range may also be employed (e.g., basis weights above about 30 gsm), lower basis weights minimize material cost as well as maximize consumer satisfaction (e.g., a thinner film may provide increased comfort to the user of a personal hygiene product that includes the film). The basis weight of a multi-layer film 2 in accordance with the present disclosure may be one of several different values or fall within one of several different ranges. For example, it is within the scope of the present disclosure to select a basis weight to be one of the following values: about 30 gsm, 29 gsm, 28 gsm, 27 gsm, 26 gsm, 25 gsm, 24 gsm, 23 gsm, 22 gsm, 21 gsm, 20 gsm, 19 gsm, 18 gsm, 17 gsm, 16 gsm, 15 gsm, 14 gsm, 13 gsm, 12 gsm, 11 gsm, 10 gsm, 9 gsm, 8 gsm, 7 gsm, 6 gsm, or 5 gsm.

It is also within the scope of the present disclosure for the basis weight of the multi-layer film 2 to fall within one of many different ranges. In a first set of ranges, the basis weight of the multi-layer film 2 is in one of the following ranges: about 5 gsm to 30 gsm, 6 gsm to 30 gsm, 7 gsm to 30 gsm, 8 gsm to 30 gsm, 9 gsm to 30 gsm, 10 gsm to 30 gsm, 11 gsm to 30 gsm, 12 gsm to 30 gsm, 13 gsm to 30 gsm, and 14 gsm to 30 gsm. In a second set of ranges, the basis weight of the microporous breathable film is in one of the following ranges: about 5 gsm to 29 gsm, 5 gsm to 28 gsm, 5 gsm to 27 gsm, 5 gsm to 26 gsm, 5 gsm to 25 gsm, 5 gsm to 24 gsm, 5 gsm to 23 gsm, 5 gsm to 22 gsm, 5 gsm to 21 gsm, 5 gsm to 20 gsm, 5 gsm to 19 gsm, 5 gsm to 18 gsm, 5 gsm to 17 gsm, 5 gsm to 16 gsm, 5 gsm to 15 gsm, 5 gsm to 14 gsm, 5 gsm to 13 gsm, 5 gsm to 12 gsm, 5 gsm to 11 gsm, 5 gsm to 10 gsm, 5 gsm to 9 gsm, 5 gsm to 8 gsm, and 5 gsm to 7 gsm. In a third set of ranges, the basis weight of the multi-layer film 2 is in one of the following ranges: about 6 gsm to 29 gsm, 7 gsm to 29 gsm, 7 gsm to 28 gsm, 7 gsm to 27 gsm, 7 gsm to 26 gsm, 7 gsm to 25 gsm, 7 gsm to 24 gsm, 7 gsm to 23 gsm, 7 gsm to 22 gsm, 7 gsm to 21 gsm, 7 gsm to 20 gsm, 7 gsm to 19 gsm, 7 gsm to 18 gsm, 7 gsm to 17 gsm, 7 gsm to 16 gsm, 7 gsm to 15 gsm, 7 gsm to 14 gsm, 7 gsm to 13 gsm, 7 gsm to 12 gsm, 7 gsm to 11 gsm, and 7 gsm to 10 gsm.

In illustrative embodiments, a multi-layer film 2 in accordance with the present disclosure exhibits greater tensile strength at peak machine direction than conventional multi-layer films of similar basis weight. The basis weight of a multi-layer film 2 in accordance with the present disclosure may be varied based on a desired tensile strength at peak machine direction. In one example, a multi-layer film 2 in accordance with the present disclosure has a basis weight of less than about 14 gsm and a tensile strength at peak machine direction of at least about 500 grams/inch (g/in). In another example, a multi-layer film 2 in accordance with the present disclosure has a basis weight of less than about 14 gsm and a tensile strength at peak machine direction of at least about 600 grams/inch. In a further example, a multi-layer film 2 in accordance with the present disclosure has a basis weight of less than about 14 gsm and a tensile strength at peak machine direction of at least about 700 g/in. In a further example, a multi-layer film 2 in accordance with the present disclosure has a basis weight of less than about 14 gsm and a tensile strength at peak machine direction of at least about 800 g/in.

The tensile strength at peak machine direction of a multi-layer film 2 in accordance with the present disclosure may be one of several different values or fall within one of several different ranges. For example, for a multi-layer film having a basis weight of less than about 14 gsm—in some embodiments, less than about 13 gsm, 12 gsm, 11 gsm, or 10 gsm—it is within the scope of the present disclosure to select a tensile strength at peak machine direction to be greater than or equal to one of the following values: about 575 g/in, 576 g/in, 577 g/in, 578 g/in, 579 g/in, 580 g/in, 581 g/in, 582 g/in, 583 g/in, 584 g/in, 585 g/in, 586 g/in, 587 g/in, 588 g/in, 589 g/in, 590 g/in, 591 g/in, 592 g/in, 593 g/in, 594 g/in, 595 g/in, 596 g/in, 597 g/in, 598 g/in, 599 g/in, 600 g/in, 601 g/in, 602 g/in, 603 g/in, 604 g/in, 605 g/in, 606 g/in, 607 g/in, 608 g/in, 609 g/in, 610 g/in, 611 g/in, 612 g/in, 613 g/in, 614 g/in, 615 g/in, 616 g/in, 617 g/in, 618 g/in, 619 g/in, 620 g/in, 621 g/in, 622 g/in, 623 g/in, 624 g/in, 625 g/in, 626 g/in, 627 g/in, 628 g/in, 629 g/in, 630 g/in, 631 g/in, 632 g/in, 633 g/in, 634 g/in, 635 g/in, 636 g/in, 637 g/in, 638 g/in, 639 g/in, 640 g/in, 641 g/in, 642 g/in, 643 g/in, 644 g/in, 645 g/in, 646 g/in, 647 g/in, 648 g/in, 649 g/in, 650 g/in, 651 g/in, 652 g/in, 653 g/in, 654 g/in, 655 g/in, 656 g/in, 657 g/in, 658 g/in, 659 g/in, 660 g/in, 661 g/in, 662 g/in, 663 g/in, 664 g/in, 665 g/in, 666 g/in, 667 g/in, 668 g/in, 669 g/in, 670 g/in, 671 g/in, 672 g/in, 673 g/in, 674 g/in, 675 g/in, 676 g/in, 677 g/in, 678 g/in, 679 g/in, 680 g/in, 681 g/in, 682 g/in, 683 g/in, 684 g/in, 685 g/in, 686 g/in, 687 g/in, 688 g/in, 689 g/in, 690 g/in, 691 g/in, 692 g/in, 693 g/in, 694 g/in, 695 g/in, 696 g/in, 697 g/in, 698 g/in, 699 g/in, 700 g/in, 701 g/in, 702 g/in, 703 g/in, 704 g/in, 705 g/in, 706 g/in, 707 g/in, 708 g/in, 709 g/in, 710 g/in, 711 g/in, 712 g/in, 713 g/in, 714 g/in, 715 g/in, 716 g/in, 717 g/in, 718 g/in, 719 g/in, 720 g/in, 721 g/in, 722 g/in, 723 g/in, 724 g/in, 725 g/in, 726 g/in, 727 g/in, 728 g/in, 729 g/in, 730 g/in, 731 g/in, 732 g/in, 733 g/in, 734 g/in, 735 g/in, 736 g/in, 737 g/in, 738 g/in, 739 g/in, 740 g/in, 741 g/in, 742 g/in, 743 g/in, 744 g/in, 745 g/in, 746 g/in, 747 g/in, 748 g/in, 749 g/in, 750 g/in, 751 g/in, 752 g/in, 753 g/in, 754 g/in, 755 g/in, 756 g/in, 757 g/in, 758 g/in, 759 g/in, 760 g/in, 761 g/in, 762 g/in, 763 g/in, 764 g/in, 765 g/in, 766 g/in, 767 g/in, 768 g/in, 769 g/in, 770 g/in, 771 g/in, 772 g/in, 773 g/in, 774 g/in, 775 g/in, 776 g/in, 777 g/in, 778 g/in, 779 g/in, 780 g/in, 781 g/in, 782 g/in, 783 g/in, 784 g/in, 785 g/in, 786 g/in, 787 g/in, 788 g/in, 789 g/in, 790 g/in, 791 g/in, 792 g/in, 793 g/in, 794 g/in, 795 g/in, 796 g/in, 797 g/in, 798 g/in, 799 g/in, 800 g/in, 801 g/in, 802 g/in, 803 g/in, 804 g/in, 805 g/in, 806 g/in, 807 g/in, 808 g/in, 809 g/in, 810 g/in, 811 g/in, 812 g/in, 813 g/in, 814 g/in, 815 g/in, 816 g/in, 817 g/in, 818 g/in, 819 g/in, 820 g/in, 821 g/in, 822 g/in, 823 g/in, 824 g/in, 825 g/in, 826 g/in, 827 g/in, 828 g/in, 829 g/in, 830 g/in, 831 g/in, 832 g/in, 833 g/in, 834 g/in, 835 g/in, 836 g/in, 837 g/in, 838 g/in, 839 g/in, 840 g/in, 841 g/in, 842 g/in, 843 g/in, 844 g/in, 845 g/in, 846 g/in, 847 g/in, 848 g/in, 849 g/in, 850 g/in, 851 g/in, 852 g/in, 853 g/in, 854 g/in, 855 g/in, 856 g/in, 857 g/in, 858 g/in, 859 g/in, 860 g/in, 861 g/in, 862 g/in, 863 g/in, 864 g/in, 865 g/in, 866 g/in, 867 g/in, 868 g/in, 869 g/in, 870 g/in, or 871 g/in.

It is also within the scope of the present disclosure for the tensile strength at peak machine direction of the multi-layer film 2 to fall within one of many different ranges. In a first set of ranges, the tensile strength at peak machine direction for a multi-layer film having a basis weight of less than about 14 gsm—in some embodiments, less than about 13 gsm, 12 gsm, 11 gsm, or 10 gsm—is in one of the following ranges: about 575 g/in to 1,000 g/in, 575 g/in to 995 g/in, 575 g/in to 990 g/in, 575 g/in to 985 g/in, 575 g/in to 980 g/in, 575 g/in to 975 g/in, 575 g/in to 970 g/in, 575 g/in to 965 g/in, 575 g/in to 960 g/in, 575 g/in to 955 g/in, 575 g/in to 950 g/in, 575 g/in to 945 g/in, 575 g/in to 940 g/in, 575 g/in to 935 g/in, 575 g/in to 930 g/in, 575 g/in to 925 g/in, 575 g/in to 920 g/in, 575 g/in to 915 g/in, 575 g/in to 910 g/in, 575 g/in to 905 g/in, 575 g/in to 900 g/in, 575 g/in to 895 g/in, 575 g/in to 890 g/in, 575 g/in to 885 g/in, 575 g/in to 880 g/in, 575 g/in to 875 g/in, and 575 g/in to 870 g/in. In a second set of ranges, the tensile strength at peak machine direction for a multi-layer film 2 having a basis weight of less than about 14 gsm—in some embodiments, less than about 13 gsm, 12 gsm, 11 gsm, or 10 gsm—is in one of the following ranges: about 576 g/in to 1000 g/in, 577 g/in to 1000 g/in, 578 g/in to 1000 g/in, 579 g/in to 1000 g/in, 580 g/in to 1000 g/in, 581 g/in to 1000 g/in, 582 g/in to 1000 g/in, 583 g/in to 1000 g/in, 584 g/in to 1000 g/in, 585 g/in to 1000 g/in, 586 g/in to 1000 g/in, 587 g/in to 1000 g/in, 588 g/in to 1000 g/in, 589 g/in to 1000 g/in, 600 g/in to 1000 g/in, 601 g/in to 1000 g/in, 602 g/in to 1000 g/in, 603 g/in to 1000 g/in, 604 g/in to 1000 g/in, 605 g/in to 1000 g/in, 606 g/in to 1000 g/in, 607 g/in to 1000 g/in, 608 g/in to 1000 g/in, 609 g/in to 1000 g/in, 610 g/in to 1000 g/in, 611 g/in to 1000 g/in, 612 g/in to 1000 g/in, 613 g/in to 1000 g/in, 614 g/in to 1000 g/in, 615 g/in to 1000 g/in, 616 g/in to 1000 g/in, 617 g/in to 1000 g/in, 618 g/in to 1000 g/in, 619 g/in to 1000 g/in, 620 g/in to 1000 g/in, 621 g/in to 1000 g/in, 622 g/in to 1000 g/in, 623 g/in to 1000 g/in, 624 g/in to 1000 g/in, 625 g/in to 1000 g/in, 626 g/in to 1000 g/in, 627 g/in to 1000 g/in, 628 g/in to 1000 g/in, 629 g/in to 1000 g/in, 630 g/in to 1000 g/in, 631 g/in to 1000 g/in, 632 g/in to 1000 g/in, 633 g/in to 1000 g/in, 634 g/in to 1000 g/in, 635 g/in to 1000 g/in, 636 g/in to 1000 g/in, 637 g/in to 1000 g/in, 638 g/in to 1000 g/in, 639 g/in to 1000 g/in, 640 g/in to 1000 g/in, 641 g/in to 1000 g/in, 642 g/in to 1000 g/in, 643 g/in to 1000 g/in, 644 g/in to 1000 g/in, 645 g/in to 1000 g/in, 646 g/in to 1000 g/in, 647 g/in to 1000 g/in, 648 g/in to 1000 g/in, 649 g/in to 1000 g/in, 650 g/in to 1000 g/in, 651 g/in to 1000 g/in, 652 g/in to 1000 g/in, 653 g/in to 1000 g/in, 654 g/in to 1000 g/in, 655 g/in to 1000 g/in, 656 g/in to 1000 g/in, 657 g/in to 1000 g/in, 658 g/in to 1000 g/in, 659 g/in to 1000 g/in, 660 g/in to 1000 g/in, 661 g/in to 1000 g/in, 662 g/in to 1000 g/in, 663 g/in to 1000 g/in, 664 g/in to 1000 g/in, 665 g/in to 1000 g/in, 666 g/in to 1000 g/in, 667 g/in to 1000 g/in, 668 g/in to 1000 g/in, 669 g/in to 1000 g/in, 670 g/in to 1000 g/in, 671 g/in to 1000 g/in, 672 g/in to 1000 g/in, 673 g/in to 1000 g/in, 674 g/in to 1000 g/in, 675 g/in to 1000 g/in, 676 g/in to 1000 g/in, 677 g/in to 1000 g/in, 678 g/in to 1000 g/in, 679 g/in to 1000 g/in, 680 g/in to 1000 g/in, 681 g/in to 1000 g/in, 682 g/in to 1000 g/in, 683 g/in to 1000 g/in, 684 g/in to 1000 g/in, 685 g/in to 1000 g/in, 686 g/in to 1000 g/in, 687 g/in to 1000 g/in, 688 g/in to 1000 g/in, 689 g/in to 1000 g/in, 690 g/in to 1000 g/in, 691 g/in to 1000 g/in, 692 g/in to 1000 g/in, 693 g/in to 1000 g/in, 694 g/in to 1000 g/in, 695 g/in to 1000 g/in, 696 g/in to 1000 g/in, 697 g/in to 1000 g/in, 698 g/in to 1000 g/in, 699 g/in to 1000 g/in, 700 g/in to 1000 g/in, 701 g/in to 1000 g/in, 702 g/in to 1000 g/in, 703 g/in to 1000 g/in, 704 g/in to 1000 g/in, 705 g/in to 1000 g/in, 706 g/in to 1000 g/in, 707 g/in to 1000 g/in, 708 g/in to 1000 g/in, 709 g/in to 1000 g/in, 710 g/in to 1000 g/in, 711 g/in to 1000 g/in, 712 g/in to 1000 g/in, 713 g/in to 1000 g/in, 714 g/in to 1000 g/in, 715 g/in to 1000 g/in, 716 g/in to 1000 g/in, 717 g/in to 1000 g/in, 718 g/in to 1000 g/in, 719 g/in to 1000 g/in, 720 g/in to 1000 g/in, 721 g/in to 1000 g/in, 722 g/in to 1000 g/in, 723 g/in to 1000 g/in, 724 g/in to 1000 g/in, 725 g/in to 1000 g/in, 726 g/in to 1000 g/in, 727 g/in to 1000 g/in, 728 g/in to 1000 g/in, 729 g/in to 1000 g/in, 730 g/in to 1000 g/in, 731 g/in to 1000 g/in, 732 g/in to 1000 g/in, 733 g/in to 1000 g/in, 734 g/in to 1000 g/in, 735 g/in to 1000 g/in, 736 g/in to 1000 g/in, 737 g/in to 1000 g/in, 738 g/in to 1000 g/in, 739 g/in to 1000 g/in, 740 g/in to 1000 g/in, 741 g/in to 1000 g/in, 742 g/in to 1000 g/in, 743 g/in to 1000 g/in, 744 g/in to 1000 g/in, 745 g/in to 1000 g/in, 746 g/in to 1000 g/in, 747 g/in to 1000 g/in, 748 g/in to 1000 g/in, 749 g/in to 1000 g/in, 750 g/in to 1000 g/in, 751 g/in to 1000 g/in, 752 g/in to 1000 g/in, 753 g/in to 1000 g/in, 754 g/in to 1000 g/in, 755 g/in to 1000 g/in, 756 g/in to 1000 g/in, 757 g/in to 1000 g/in, 758 g/in to 1000 g/in, 759 g/in to 1000 g/in, 760 g/in to 1000 g/in, 761 g/in to 1000 g/in, 762 g/in to 1000 g/in, 763 g/in to 1000 g/in, 764 g/in to 1000 g/in, 765 g/in to 1000 g/in, 766 g/in to 1000 g/in, 767 g/in to 1000 g/in, 768 g/in to 1000 g/in, 769 g/in to 1000 g/in, 770 g/in to 1000 g/in, 771 g/in to 1000 g/in, 772 g/in to 1000 g/in, 773 g/in to 1000 g/in, 774 g/in to 1000 g/in, 775 g/in to 1000 g/in, 776 g/in to 1000 g/in, 777 g/in to 1000 g/in, 778 g/in to 1000 g/in, 779 g/in to 1000 g/in, 780 g/in to 1000 g/in, 781 g/in to 1000 g/in, 782 g/in to 1000 g/in, 783 g/in to 1000 g/in, 784 g/in to 1000 g/in, 785 g/in to 1000 g/in, 786 g/in to 1000 g/in, 787 g/in to 1000 g/in, 788 g/in to 1000 g/in, 789 g/in to 1000 g/in, 790 g/in to 1000 g/in, 791 g/in to 1000 g/in, 792 g/in to 1000 g/in, 793 g/in to 1000 g/in, 794 g/in to 1000 g/in, 795 g/in to 1000 g/in, 796 g/in to 1000 g/in, 797 g/in to 1000 g/in, 798 g/in to 1000 g/in, 799 g/in to 1000 g/in, and 800 g/in to 1000 g/in. In a third set of ranges, the tensile strength at peak machine direction for a multi-layer film 2 having a basis weight of less than about 14 gsm—in some embodiments, less than about 13 gsm, 12 gsm, 11 gsm, or 10 gsm—is in one of the following ranges: about 575 g/in to 950 g/in, 580 g/in to 945 g/in, 585 g/in to 940 g/in, 590 g/in to 935 g/in, 595 g/in to 930 g/in, 600 g/in to 925 g/in, 605 g/in to 920 g/in, 610 g/in to 915 g/in, 615 g/in to 910 g/in, 620 g/in to 905 g/in, 625 g/in to 900 g/in, 630 g/in to 900 g/in, 635 g/in to 900 g/in, 640 g/in to 900 g/in, 645 g/in to 900 g/in, 650 g/in to 900 g/in, 655 g/in to 900 g/in, 660 g/in to 900 g/in, 665 g/in to 900 g/in, 670 g/in to 900 g/in, 675 g/in to 900 g/in, 680 g/in to 900 g/in, 685 g/in to 900 g/in, 690 g/in to 900 g/in, 695 g/in to 900 g/in, 700 g/in to 900 g/in, 705 g/in to 900 g/in, 710 g/in to 900 g/in, 715 g/in to 900 g/in, 720 g/in to 900 g/in, 725 g/in to 900 g/in, 730 g/in to 900 g/in, 735 g/in to 900 g/in, 740 g/in to 900 g/in, 745 g/in to 900 g/in, 750 g/in to 900 g/in, 755 g/in to 900 g/in, 760 g/in to 900 g/in, 765 g/in to 900 g/in, 770 g/in to 900 g/in, 775 g/in to 900 g/in, 780 g/in to 900 g/in, 785 g/in to 900 g/in, 790 g/in to 900 g/in, 795 g/in to 900 g/in, and 800 g/in to 900 g/in.

In illustrative embodiments, a multi-layer film 2 in accordance with the present disclosure exhibits greater increased tensile strength at 5% strain machine direction than conventional multi-layer films of similar basis weight. The basis weight of a multi-layer film 2 in accordance with the present disclosure may be varied based on a desired tensile strength at 5% strain machine direction. In one example, a multi-layer film 2 in accordance with the present disclosure has a basis weight of less than about 14 gsm and a tensile strength at 5% strain machine direction of at least about 170 grams/inch (g/in). In another example, a multi-layer film 2 in accordance with the present disclosure has a basis weight of less than about 14 gsm and a tensile strength at 5% strain machine direction of at least about 180 grams/inch. In a further example, a multi-layer film 2 in accordance with the present disclosure has a basis weight of less than about 14 gsm and a tensile strength at 5% strain machine direction of at least about 190 g/in. In a further example, a multi-layer film 2 in accordance with the present disclosure has a basis weight of less than about 14 gsm and a tensile strength at 5% strain machine direction of at least about 200 g/in.

The tensile strength at 5% strain machine direction of a multi-layer film 2 in accordance with the present disclosure may be one of several different values or fall within one of several different ranges. For example, for a multi-layer film having a basis weight of less than about 14 gsm—in some embodiments, less than about 13 gsm, 12 gsm, 11 gsm, or 10 gsm—it is within the scope of the present disclosure to select a tensile strength at 5% strain machine direction to be greater than or equal to one of the following values: about 100 g/in, 101 g/in, 102 g/in, 103 g/in, 104 g/in, 105 g/in, 106 g/in, 107 g/in, 108 g/in, 109 g/in, 110 g/in, 111 g/in, 112 g/in, 113 g/in, 114 g/in, 115 g/in, 116 g/in, 117 g/in, 118 g/in, 119 g/in, 120 g/in, 121 g/in, 122 g/in, 123 g/in, 124 g/in, 125 g/in, 126 g/in, 127 g/in, 128 g/in, 129 g/in, 130 g/in, 131 g/in, 132 g/in, 133 g/in, 134 g/in, 135 g/in, 136 g/in, 137 g/in, 138 g/in, 139 g/in, 140 g/in, 141 g/in, 142 g/in, 143 g/in, 144 g/in, 145 g/in, 146 g/in, 147 g/in, 148 g/in, 149 g/in, 150 g/in, 151 g/in, 152 g/in, 153 g/in, 154 g/in, 155 g/in, 156 g/in, 157 g/in, 158 g/in, 159 g/in, 160 g/in, 161 g/in, 162 g/in, 163 g/in, 164 g/in, 165 g/in, 166 g/in, 167 g/in, 168 g/in, 169 g/in, 170 g/in, 171 g/in, 172 g/in, 173 g/in, 174 g/in, 175 g/in, 176 g/in, 177 g/in, 178 g/in, 179 g/in, 180 g/in, 181 g/in, 182 g/in, 183 g/in, 184 g/in, 185 g/in, 186 g/in, 187 g/in, 188 g/in, 189 g/in, 190 g/in, 191 g/in, 192 g/in, 193 g/in, 194 g/in, 195 g/in, 196 g/in, 197 g/in, 198 g/in, 199 g/in, 200 g/in, 201 g/in, 202 g/in, 203 g/in, 204 g/in, 205 g/in, 206 g/in, 207 g/in, 208 g/in, 209 g/in, 210 g/in, 211 g/in, 212 g/in, 213 g/in, 214 g/in, 215 g/in, 216 g/in, 217 g/in, 218 g/in, 219 g/in, 220 g/in, 221 g/in, 222 g/in, 223 g/in, 224 g/in, 225 g/in, 226 g/in, 227 g/in, 228 g/in, 229 g/in, 230 g/in, 231 g/in, 232 g/in, 233 g/in, 234 g/in, 235 g/in, 236 g/in, 237 g/in, 238 g/in, 239 g/in, 240 g/in, 241 g/in, 242 g/in, 243 g/in, 244 g/in, 245 g/in, 246 g/in, 247 g/in, 248 g/in, 249 g/in, 250 g/in, 251 g/in, 252 g/in, 253 g/in, 254 g/in, 255 g/in, 256 g/in, 257 g/in, 258 g/in, 259 g/in, 260 g/in, 261 g/in, 262 g/in, 263 g/in, 264 g/in, 265 g/in, 266 g/in, 267 g/in, 268 g/in, 269 g/in, 270 g/in, 271 g/in, 272 g/in, 273 g/in, 274 g/in, 275 g/in, 276 g/in, 277 g/in, 278 g/in, 279 g/in, 280 g/in, 281 g/in, 282 g/in, 283 g/in, 284 g/in, 285 g/in, 286 g/in, 287 g/in, 288 g/in, 289 g/in, 290 g/in, 291 g/in, 292 g/in, 293 g/in, 294 g/in, 295 g/in, 296 g/in, 297 g/in, 298 g/in, 299 g/in, or 300 g/in.

It is also within the scope of the present disclosure for the tensile strength at 5% strain machine direction of the multi-layer film 2 to fall within one of many different ranges. In a first set of ranges, the tensile strength at 5% strain machine direction for a multi-layer film having a basis weight of less than about 14 gsm—in some embodiments, less than about 13 gsm, 12 gsm, 11 gsm, or 10 gsm—is in one of the following ranges: about 100 g/in to 400 g/in, 100 g/in to 395 g/in, 100 g/in to 390 g/in, 100 g/in to 380 g/in, 100 g/in to 380 g/in, 100 g/in to 375 g/in, 100 g/in to 370 g/in, 100 g/in to 365 g/in, 100 g/in to 360 g/in, 100 g/in to 355 g/in, 100 g/in to 350 g/in, 100 g/in to 345 g/in, 100 g/in to 340 g/in, 100 g/in to 335 g/in, 100 g/in to 330 g/in, 100 g/in to 325 g/in, 100 g/in to 320 g/in, 100 g/in to 315 g/in, 100 g/in to 310 g/in, 100 g/in to 305 g/in, and 100 g/in to 300 g/in. In a second set of ranges, the tensile strength at 5% strain machine direction for a multi-layer film having a basis weight of less than about 14 gsm—in some embodiments, less than about 13 gsm, 12 gsm, 11 gsm, or 10 gsm—is in one of the following ranges: about 101 g/in to 400 g/in, 105 g/in to 400 g/in, 110 g/in to 400 g/in, 115 g/in to 400 g/in, 120 g/in to 400 g/in, 125 g/in to 400 g/in, 130 g/in to 400 g/in, 135 g/in to 400 g/in, 140 g/in to 400 g/in, 145 g/in to 400 g/in, 150 g/in to 400 g/in, 155 g/in to 400 g/in, 160 g/in to 400 g/in, 165 g/in to 400 g/in, 170 g/in to 400 g/in, 175 g/in to 400 g/in, 180 g/in to 400 g/in, 185 g/in to 400 g/in, 190 g/in to 400 g/in, 195 g/in to 400 g/in, 200 g/in to 400 g/in, 205 g/in to 400 g/in, 210 g/in to 400 g/in, 215 g/in to 400 g/in, 220 g/in to 400 g/in, 225 g/in to 400 g/in, 230 g/in to 400 g/in, 235 g/in to 400 g/in, 240 g/in to 400 g/in, 245 g/in to 400 g/in, 250 g/in to 400 g/in, 255 g/in to 400 g/in, 260 g/in to 400 g/in, 265 g/in to 400 g/in, 270 g/in to 400 g/in, 275 g/in to 400 g/in, and 280 g/in to 400 g/in. In a third set of ranges, the tensile strength at 5% strain machine direction for a multi-layer film 2 having a basis weight of less than about 14 gsm—in some embodiments, less than about 13 gsm, 12 gsm, 11 gsm, or 10 gsm—is in one of the following ranges: about 101 g/in to 395 g/in, 105 g/in to 390 g/in, 110 g/in to 385 g/in, 115 g/in to 380 g/in, 120 g/in to 375 g/in, 125 g/in to 370 g/in, 130 g/in to 365 g/in, 135 g/in to 360 g/in, 140 g/in to 355 g/in, 145 g/in to 350 g/in, 150 g/in to 345 g/in, 155 g/in to 340 g/in, 160 g/in to 335 g/in, 165 g/in to 330 g/in, 170 g/in to 325 g/in, 175 g/in to 320 g/in, 180 g/in to 315 g/in, 185 g/in to 310 g/in, 190 g/in to 305 g/in, 195 g/in to 300 g/in, 200 g/in to 295 g/in, and 205 g/in to 290 g/in.

In illustrative embodiments, a multi-layer film 2 in accordance with the present disclosure exhibits greater increased secant modulus machine direction (1%) than conventional multi-layer films of similar basis weight. The basis weight of a multi-layer film 2 in accordance with the present disclosure may be varied based on a desired secant modulus machine direction (1%). In one example, a multi-layer film 2 in accordance with the present disclosure has a basis weight of less than about 14 gsm and a secant modulus machine direction (1%) of at least about 20,000 pounds/inch (psi). In another example, a multi-layer film 2 in accordance with the present disclosure has a basis weight of less than about 14 gsm and a secant modulus machine direction (1%) of at least about 25,000 psi. In a further example, a multi-layer film 2 in accordance with the present disclosure has a basis weight of less than about 14 gsm and a secant modulus machine direction (1%) of at least about 30,000 psi. In a further example, a multi-layer film 2 in accordance with the present disclosure has a basis weight of less than about 14 gsm and a secant modulus machine direction (1%) of at least about 35,000 psi.

The secant modulus machine direction (1%) of a multi-layer film 2 in accordance with the present disclosure may be one of several different values or fall within one of several different ranges. For example, for a multi-layer film having a basis weight of less than about 14 gsm—in some embodiments, less than about 13 gsm, 12 gsm, 11 gsm, or 10 gsm—it is within the scope of the present disclosure to select a secant modulus machine direction (1%) to be greater than or equal to one of the following values: about 30,000 psi; 30,500 psi; 31,000 psi; 31,500 psi; 32,000 psi; 32,500 psi; 33,000 psi; 33,500 psi; 34,000 psi; 34,500 psi; 35,000 psi; 35,500 psi; 36,000 psi; 36,500 psi; 37,000 psi; 37,500 psi; 38,000 psi; 38,500 psi; 39,000 psi; 39,500 psi; 40,000 psi; 40,500 psi; 41,000 psi; 41,500 psi; 42,000 psi; 42,500 psi; 43,000 psi; 43,500 psi; 44,000 psi; 44,500 psi; 45,000 psi; 45,500 psi; 46,000 psi; 46,500 psi; 47,000 psi; 47,500 psi; 48,000 psi; 48,500 psi; 49,000 psi; 49,500 psi; 50,000 psi; 50,500 psi; 51,000 psi; 51,500 psi; 52,000 psi; 52,500 psi; 53,000 psi; 53,500 psi; 54,000 psi; 54,500 psi; 55,000 psi; 55,500 psi; 56,000 psi; 56,500 psi; 57,000 psi; or 57,500 psi.

It is also within the scope of the present disclosure for the secant modulus machine direction (1%) of the multi-layer film 2 to fall within one of many different ranges. In a first set of ranges, the secant modulus machine direction (1%) for a multi-layer film having a basis weight of less than about 14 gsm—in some embodiments, less than about 13 gsm, 12 gsm, 11 gsm, or 10 gsm—is in one of the following ranges: about 35,000 psi to 65,000 psi; 35,500 psi to 65,000 psi; 40,000 psi to 65,000 psi; 40,500 psi to 65,000 psi; 41,000 psi to 65,000 psi; 41,500 psi to 65,000 psi; 42,000 psi to 65,000 psi; 42,500 psi to 65,000 psi; 43,000 psi to 65,000 psi; 43,500 psi to 65,000 psi; 44,000 psi to 65,000 psi; 44,500 psi to 65,000 psi; 45,000 psi to 65,000 psi; 45,500 psi to 65,000 psi; 46,000 psi to 65,000 psi; 46,500 psi to 65,000 psi; 47,000 psi to 65,000 psi; 47,500 psi to 65,000 psi; 48,000 psi to 65,000 psi; 48,500 psi to 65,000 psi; 49,000 psi to 65,000 psi; 49,500 psi to 65,000 psi; 50,000 psi to 65,000 psi; 50,500 psi to 65,000 psi; 51,000 psi to 65,000 psi; 51,500 psi to 65,000 psi; 52,000 psi to 65,000 psi; 52,500 psi to 65,000 psi; 53,000 psi to 65,000 psi; 53,500 psi to 65,000 psi; 54,000 psi to 65,000 psi; 54,500 psi to 65,000 psi; 55,000 psi to 65,000 psi; 55,500 psi to 65,000 psi; 56,000 psi to 65,000 psi; 56,500 psi to 65,000 psi; and 57,000 psi to 65,000 psi. In a second set of ranges, the secant modulus machine direction (1%) for a multi-layer film 2 having a basis weight of less than about 14 gsm—in some embodiments, less than about 13 gsm, 12 gsm, 11 gsm, or 10 gsm—is in one of the following ranges: about 35,000 psi to 64,999 psi; 35,000 psi to 64,500 psi; 35,000 psi to 64,000 psi; 35,000 psi to 63,500 psi; 35,000 psi to 63,000 psi; 35,000 psi to 62,500 psi; 35,000 psi to 62,000 psi; 35,000 psi to 61,500 psi; 35,000 psi to 61,000 psi; 35,000 psi to 60,500 psi; 35,000 psi to 60,000 psi; 35,000 psi to 59,500 psi; 35,000 psi to 59,000 psi; 35,000 psi to 58,500 psi; 35,000 psi to 58,000 psi; and 35,000 psi to 57,500 psi. In a third set of ranges, the secant modulus machine direction (1%) for a multi-layer film 2 having a basis weight of less than about 14 gsm—in some embodiments, less than about 13 gsm, 12 gsm, 11 gsm, or 10 gsm—is in one of the following ranges: about 35,001 psi to 64,999 psi; 35,500 psi to 64,500 psi; 34,000 psi to 64,000 psi; 34,500 psi to 63,500 psi; 35,000 psi to 63,000 psi; 35,500 psi to 62,500 psi; 36,000 psi to 62,000 psi; 36,500 psi to 61,500 psi; 37,000 psi to 61,000 psi; 37,500 psi to 60,500 psi; 38,000 psi to 60,000 psi; 38,500 psi to 59,500 psi; 39,000 psi to 59,000 psi; 39,500 psi to 58,500 psi; 40,000 psi to 58,000 psi; 40,500 psi to 58,000 psi; 41,000 psi to 58,000 psi; 41,500 psi to 58,000 psi; 42,000 psi to 58,000 psi; 42,500 psi to 58,000 psi; 43,000 psi to 58,000 psi; 43,500 psi to 58,000 psi; 44,000 psi to 58,000 psi; 44,500 psi to 58,000 psi; 45,000 psi to 58,000 psi; 45,500 psi to 58,000 psi; 46,000 psi to 58,000 psi; 46,500 psi to 58,000 psi; 47,000 psi to 58,000 psi; 47,500 psi to 58,000 psi; 48,000 psi to 58,000 psi; 48,500 psi to 58,000 psi; 49,000 psi to 58,000 psi; 49,500 psi to 58,000 psi; 50,000 psi to 58,000 psi; 50,500 psi to 58,000 psi; 51,000 psi to 58,000 psi; 51,500 psi to 58,000 psi; 52,000 psi to 58,000 psi; 52,500 psi to 58,000 psi; 53,000 psi to 58,000 psi; 53,500 psi to 58,000 psi; 54,000 psi to 58,000 psi; 54,500 psi to 58,000 psi; 55,000 psi to 58,000 psi; 55,500 psi to 58,000 psi; 56,000 psi to 58,000 psi; 56,500 psi to 58,000 psi; and 57,000 psi to 58,000 psi.

In illustrative embodiments, a multi-layer film 2 in accordance with the present disclosure exhibits a greater Dart Impact Strength than conventional microporous breathable films of similar basis weight. The basis weight of a multi-layer film 2 in accordance with the present disclosure may be varied based on a desired Dart Impact Strength. In one example, a multi-layer film 2 in accordance with the present disclosure has a basis weight of less than about 14 gsm and a Dart Impact Strength of at least about 35 grams. In another example, a multi-layer film 2 in accordance with the present disclosure has a basis weight of less than about 14 gsm and a Dart Impact Strength of at least about 40 grams. In a further example, a multi-layer film 2 in accordance with the present disclosure has a basis weight of less than about 14 gsm and a Dart Impact Strength of at least about 45 grams. In a still further example, a multi-layer film 2 in accordance with the present disclosure has a basis weight of less than about 14 gsm and a Dart Impact Strength of at least about 50 grams.

The Dart Impact Strength of a multi-layer film 2 in accordance with the present disclosure may be one of several different values or fall within one of several different ranges. For example, for a multi-layer film 2 having a basis weight of less than about 14 gsm—in some embodiments, less than about 13 gsm, 12 gsm, 11 gsm, or 10 gsm—it is within the scope of the present disclosure to select a Dart Impact Strength to be greater than or equal to one of the following values: about 30 grams, 31 grams, 32 grams, 33 grams, 34 grams, 35 grams, 36 grams, 37 grams, 38 grams, 39 grams, 40 grams, 41 grams, 42 grams, 43 grams, 44 grams, 45 grams, 46 grams, 47 grams, 48 grams, 49 grams, 50 grams, 51 grams, 52 grams, 53 grams, 54 grams, 55 grams, 56 grams, 57 grams, 58 grams, 59 grams, 60 grams, 61 grams, 62 grams, 63 grams, 64 grams, 65 grams, 66 grams, 67 grams, 68 grams, 69 grams, 70 grams, 71 grams, 72 grams, 73 grams, 74 grams, 75 grams, 76 grams, or 77 grams.

It is also within the scope of the present disclosure for the Dart Impact Strength of the multi-layer film 2 to fall within one of many different ranges. In a first set of ranges, the Dart Impact Strength for a multi-layer film 2 having a basis weight of less than about 14 gsm—in some embodiments, less than about 13 gsm, 12 gsm, 11 gsm, or 10 gsm—is in one of the following ranges: about 30 grams to 250 grams, 35 grams to 250 grams, 40 grams to 250 grams, 45 grams to 250 grams, 50 grams to 250 grams, 55 grams to 250 grams, 60 grams to 250 grams, 65 grams to 250 grams, 70 grams to 250 grams, and 75 grams to 250 grams. In a second set of ranges, the Dart Impact Strength for a multi-layer film 2 having a basis weight of less than about 14 gsm—in some embodiments, less than about 13 gsm, 12 gsm, 11 gsm, or 10 gsm—is in one of the following ranges: about 50 grams to 249 grams, 50 grams to 245 grams, 50 grams to 240 grams, 50 grams to 235 grams, 50 grams to 230 grams, 50 grams to 225 grams, 50 grams to 220 grams, 50 grams to 215 grams, 50 grams to 210 grams, 50 grams to 205 grams, 50 grams to 200 grams, 50 grams to 195 grams, 50 grams to 190 grams, 50 grams to 185 grams, 50 grams to 180 grams, 50 grams to 175 grams, 50 grams to 170 grams, 50 grams to 165 grams, 50 grams to 160 grams, 50 grams to 155 grams, 50 grams to 150 grams, 50 grams to 145 grams, 50 grams to 140 grams, 50 grams to 135 grams, 50 grams to 130 grams, 50 grams to 125 grams, 50 grams to 120 grams, 50 grams to 115 grams, 50 grams to 110 grams, 50 grams to 105 grams, 50 grams to 100 grams, 50 grams to 95 grams, 50 grams to 90 grams, 50 grams to 85 grams, and 50 grams to 80 grams. In a third set of ranges, the Dart Impact Strength for a multi-layer film 2 having a basis weight of less than about 14 gsm—in some embodiments, less than about 13 gsm, 12 gsm, 11 gsm, or 10 gsm—is in one of the following ranges: about 31 grams to about 150 grams, 35 grams to about 145 grams, 40 grams to about 140 grams, 45 grams to about 135 grams, 50 grams to about 130 grams, 55 grams to about 125 grams, 60 grams to about 120 grams, 65 grams to about 115 grams, 70 grams to about 110 grams, 70 grams to about 105 grams, 70 grams to about 100 grams, 70 grams to about 95 grams, 70 grams to about 90 grams, 70 grams to about 85 grams, and 70 grams to about 80 grams.

In one example, a multi-layer film in accordance with the present disclosure may be manufactured by feed block coextrusion. In another example, a multi-layer film in accordance with the present disclosure may be made by blown film (tubular) coextrusion. Methods for feed block and blown film extrusion are described in *The Wiley Encyclopedia of Packaging Technology*, pp. 233-238 (Aaron L. Brody et al. eds., 2nd Ed. 1997), which is incorporated herein by reference, except that in the event of any inconsistent disclosure or definition from the present specification, the disclosure or definition herein shall be deemed to prevail. Methods for film extrusion are also described in U.S. Pat. No. 6,265,055, the entire contents of which are likewise incorporated by reference herein, except that in the event of any inconsistent disclosure or definition from the present specification, the disclosure or definition herein shall be deemed to prevail.

Figure 7:
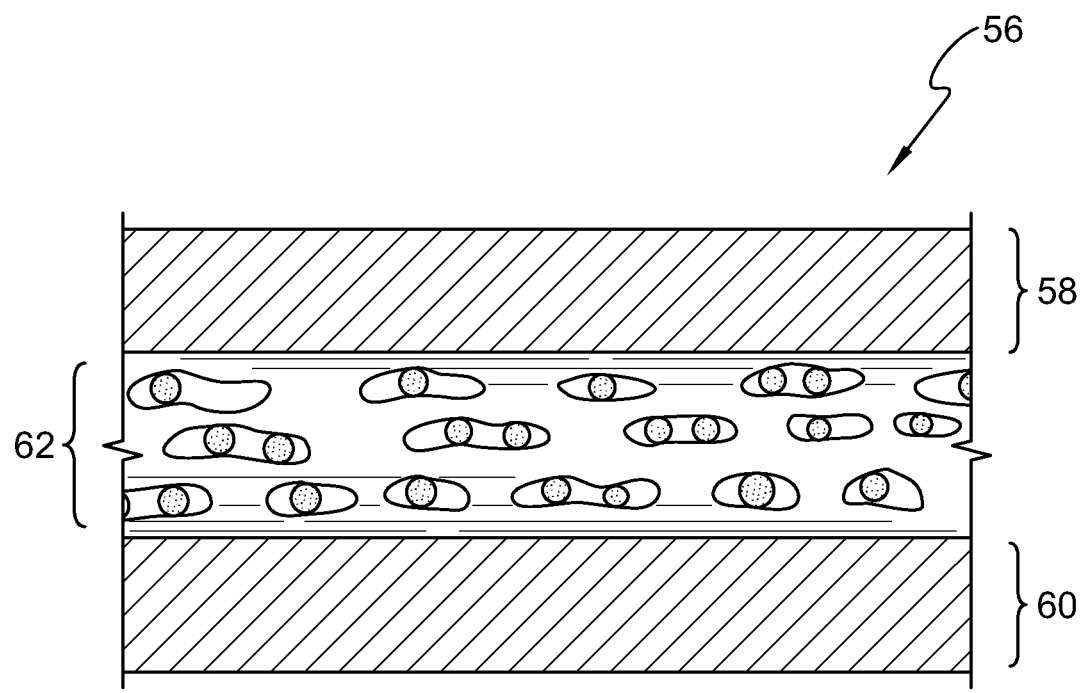
FIG. 7 is a diagrammatic view of a representative embodiment of a multi-layer non-breathable film that includes three layers.

In some embodiments, as shown in FIG. 1, the present disclosure provides a multi-layer film 2 having a single non-cavitated skin layer 13. In other embodiments, as shown in FIG. 7, the present disclosure also provides a multi-layer non-breathable film 56 having more than one non-cavitated skin layer. For example, the multi-layer non-breathable film 56 shown in FIG. 7 includes a first non-cavitated skin layer 58, a second non-cavitated skin layer 60, and at least one cavitated core layer 62 disposed between the first non-cavitated skin layer 58 and the second non-cavitated skin layer 60. The core layer 62 in FIG. 7 is analogous to the core layer 3 shown in FIG. 1, and may include a thermoplastic polymer (or combination of thermoplastic polymers) and a solid filler (or combination of solid fillers) dispersed therein. The first non-cavitated skin layer 58 and the second non-cavitated skin layer 60 may have either the same composition as the core layer 62 or a different composition than the core layer 62. In one example, as shown in FIG. 7, the first non-cavitated skin layer 58 and the second non-cavitated skin layer 60 are analogous to the non-cavitated skin layer 13 shown in FIG. 1 and may include a thermoplastic polymer (or combination of thermoplastic polymers).

Figure 8:
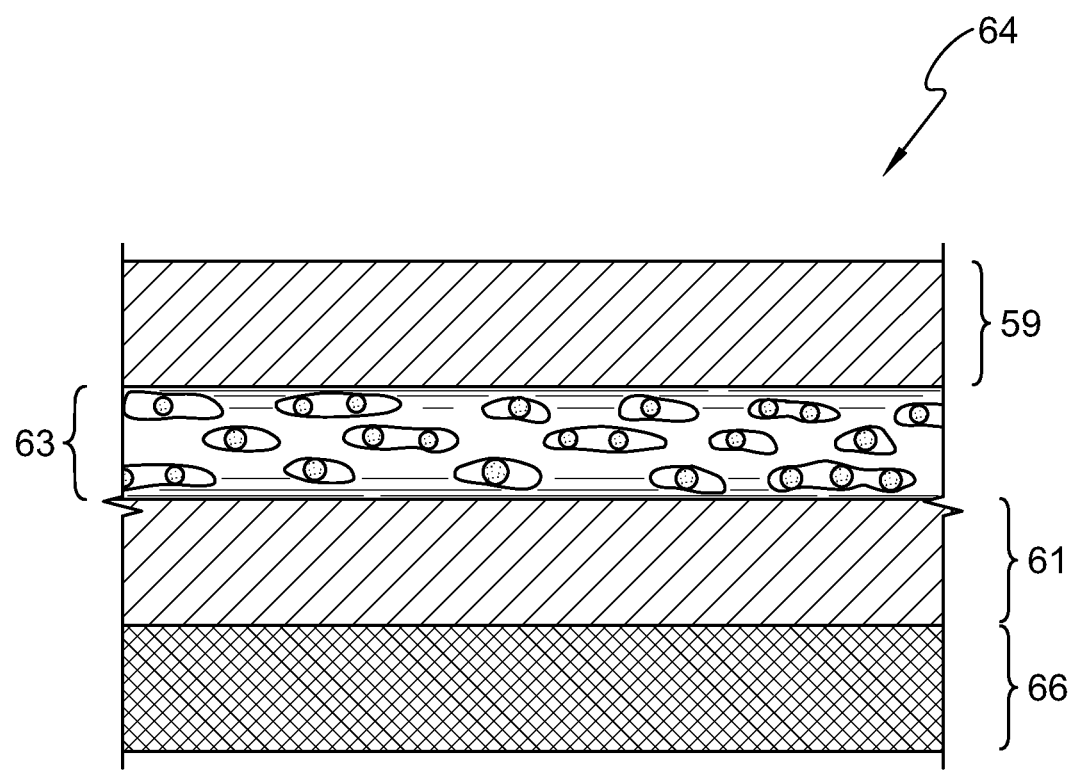
FIG. 8 is a diagrammatic view of a representative embodiment of a multi-layer non-breathable film bonded to a non-woven material.

In some embodiments, as shown in FIG. 8, a multi-layer film containing a a first non-cavitated skin layer 59, a second non-cavitated skin layer 61, and at least one cavitated core layer 63 disposed between the first non-cavitated skin layer 59 and the second non-cavitated skin layer 61 may be bonded to a non-woven layer 66 to form a multi-layer structure 64 that may, in some embodiments, be used as a backsheet for a diaper, incontinence brief, and/or the like, as further described below. As shown in FIG. 8, the non-woven layer 66 may be bonded to one or the other of the first non-cavitated skin layer 59 and the second non-cavitated skin layer 61. In some embodiments, the non-woven layer 66 and the non-cavitated skin layer to which it is adjacent (e.g., second non-cavitated skin layer 61 in the depiction of FIG. 8) include the same polyolefin. For example, in some embodiments, the non-woven layer 66, the second non-cavitated skin layer 61, and/or the first non-cavitated skin layer 59 include polypropylene. In some embodiments, the non-woven layer 66, the second non-cavitated skin layer 61, and/or the first non-cavitated skin layer 59 include polypropylene, and the non-woven layer 66 is bonded to the second non-cavitated skin layer 61 by an ultrasonic weld, as further described below.

Figure 9:
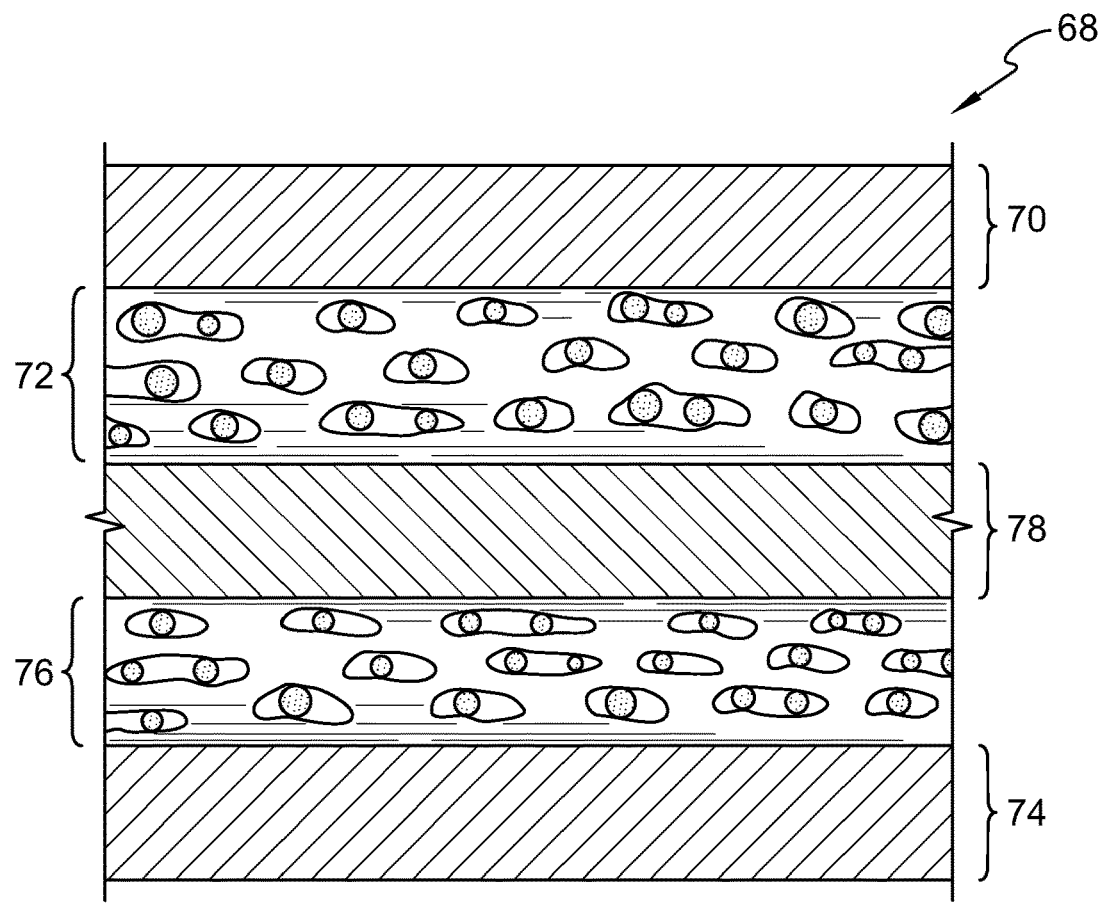
FIG. 9 is a diagrammatic view of a representative embodiment of a multi-layer non-breathable film that includes five layers.

In some embodiments, as shown in FIG. 9, a multi-layer non-breathable film 68 in accordance with the present disclosure contains a first non-cavitated skin layer 70, a second non-cavitated skin layer 74, a first cavitated core layer 72 disposed between the first non-cavitated skin layer 70 and the second non-cavitated skin layer 74, a second cavitated core layer 76 disposed between the first non-cavitated skin layer 70 and the second non-cavitated skin layer 74, and at least one polar polymer layer 78 disposed between the first non-cavitated skin layer 70 and the second non-cavitated skin layer 74. The polar polymer layer 78 is configured to act as an odor barrier that is substantially impermeable to odorants that are nonpolar.

The first cavitated core layer 72 and the second cavitated core layer 76 in FIG. 9 are analogous to the cavitated core layer 3 shown in FIG. 1, and may be prepared by a process analogous to one described above. The first cavitated core layer 72 may be the same as or different than the second cavitated core layer 76. For example, the first cavitated core layer 72 and the second cavitated core layer 76 may differ from each other in thickness, breathability, pore size, thermoplastic composition, and/or the like. In one example, the first cavitated core layer 72 and the second cavitated core layer 76 are the same, and each includes a polyolefin and an inorganic filler dispersed in the polyolefin.

The first non-cavitated skin layer 70 and the second non-cavitated skin layer 74 in FIG. 9 are analogous to the non-cavitated skin layer 13 shown in FIG. 1. The first non-cavitated skin layer 70 may be the same as or different than the second non-cavitated skin layer 74 (e.g., in thickness, plastic composition, and/or the like). In one example, the first non-cavitated skin layer 70 and the second non-cavitated skin layer 74 are the same, and each includes a polyolefin.

In illustrative embodiments, as shown in FIG. 9, the multi-layer film 68 has a symmetrical structure, and the at least one polar polymer layer 78 is disposed between the first non-cavitated skin layer 70 and the first cavitated core layer 72 on one side, and between the second cavitated core layer 76 and the second non-cavitated skin layer 74 on its other side. However, alternative configurations may likewise be implemented.

The polar polymer layer 78 shown in FIG. 9 provides an internal barrier layer and—unlike first cavitated core layer 72 and second cavitated core layer 76—may be unfilled or substantially unfilled (e.g., contain an amount of solid filler that does not result in the creation of micropores as a result of stretching). In illustrative embodiments, the polar polymer layer 78 is comprised of Nylon, polyester, ethylene vinyl alcohol (EVOH) or copolymers of these materials.

The polar polymer layer 78 provides an odor barrier. In one example, a tie layer (not shown) may be used to combine dissimilar layers (e.g., polar polymer layer 78 and one or both of first cavitated core layer 72 and second cavitated core layer 76). In another example, an adhesive may be blended in one or more of the adjacent dissimilar layers, thus avoiding delamination of the adjacent, chemically different layers.

The internal polar polymer layer 78 is selected from the group consisting of elastomers, polyesters, polyamides, polyetherester copolymers, polyetheramide copolymers, polyurethanes, polyurethane copolymers, poly(etherimide) ester copolymers, polyvinyl alcohols, ionomers, celluloses, nitrocelluloses, and/or the like, and combinations thereof. In some embodiments, the at least one polar polymer layer 78 further includes an adhesive which, in some embodiments, includes polyethylene/acrylate copolymer, ethylene/methyl acrylate copolymer, acid-modified acrylate, anhydride-modified acrylate, ethylene vinyl acetate, acid/acrylate-modified ethylene vinyl acetate, anhydride-modified ethylene vinyl acetate, and/or the like, or a combination thereof. In one example, the internal polar polymer layer 78 may constitute from about 0.5% to about 30% of the total thickness of the film 68. In another example, the polar polymer layer 78 may constitute from about 1% to about 20% of the total thickness of the film 68. In a further example, the polar polymer layer 78 may constitute from about 2% to about 10% of the total thickness of the film 68. In some embodiments (not shown), the multi-layer film 68 includes a plurality of polar polymer layers 78, and the above-described exemplary ranges of thickness percentages may be applied to the sum of the multiple polar polymer layers within the film. Multi-layer non-breathable films 68 in accordance with the present disclosure may include one or more internal polar polymer layers 78, which may be contiguous with each other or with interposed microporous breathable layers such as first cavitated core layer 72 and second cavitated core layer 76. In illustrative embodiments, one or more polar polymer layers 78 provided in a multi-layer breathable barrier film 68 in accordance with the present disclosure are monolithic and do not contain any fillers that provide sites for the development of micropores. However, polar polymer layers may contain other additives to confer desired properties to the polar polymer layer.

Representative materials for the polar polymer layer 78 include but are not limited to hygroscopic polymers such as ε-caprolactone (available from Solvay Caprolactones), polyether block amides (available from Arkema PEBAX), polyester elastomer (such as Dupont Hytrel or DSM Arnitel) and other polyesters, polyamides, celluloses (e.g., cellulose fibers), nitrocelluloses (e.g., nitrocellulose fibers), ionomers (e.g., ethylene ionomers), and/or the like, and combinations thereof. In one example, fatty acid salt-modified ionomers as described in the article entitled "Development of New Ionomers with Novel Gas Permeation Properties" (*Journal of Plastic Film and Sheeting*, 2007, 23, No. 2, 119-132) may be used as a polar polymer layer 78. In some embodiments, sodium, magnesium, and/or potassium fatty acid salt-modified ionomers may be used to provide desirable water vapor transmission properties. In some embodiments, the polar polymer layer 78 is selected from the group consisting of hygroscopic elastomers, polyesters, polyamides, polyether-ester copolymers (e.g., a block polyetherester copolymer), polyetheramide copolymers (e.g., a block polyetheramide copolymer), polyurethanes, polyurethane copolymers, poly(etherimide) ester copolymers, polyvinyl alcohols, ionomers, celluloses, nitrocelluloses, and/or the like, and combinations thereof. In one example, copolyether ester block copolymers are segmented elastomers having soft polyether segments and hard polyester segments, as described in U.S. Pat. No. 4,739,012. Representative copolyether ester block copolymers are sold by DuPont under the trade name HYTREL®. Representative copolyether amide polymers are copolyamides sold under the trade name PEBAX® by Atochem Inc. of Glen Rock, N.J. Representative polyurethanes are thermoplastic urethanes sold under the trade name ESTANE® by the B. F. Goodrich Company of Cleveland, Ohio. Representative copoly(etherimide) esters are described in U.S. Pat. No. 4,868,062.

In some embodiments, the polar polymer layer 78 may include or be blended with a thermoplastic resin. Representative thermoplastic resins that may be used for this purpose include but are not limited to polyolefins, polyesters, polyetheresters, polyamides, polyether amides, urethanes, and/or the like, and combinations thereof. In some embodiments, the thermoplastic polymer may include (a) a polyolefin, such as polyethylene, polypropylene, poly(i-butene), poly(2-butene), poly(i-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, polyvinyl acetate, poly(vinylidene chloride), polystyrene, and/or the like, and combinations thereof; (b) a polyester such as poly(ethylene terephthalate), poly(butylenes)terephthalate, poly(tetramethylene terephthalate), poly(cyclohexylene-1,4-dimethylene terephthalate), poly(oxymethylene-1,4-cyclohexylenemethyleneoxyterephthaloyl), and/or the like, and combinations thereof; and (c) a polyetherester, such as poly(oxyethylene)-poly(butylene terephthalate), poly(oxytetramethylene)-poly(ethylene terephthalate), and/or the like, and combinations thereof; and/or (d) a polyamide, such as poly(6-aminocaproic acid), poly(,-caprolactam), poly(hexamethylene adipamide), poly(hexamethylene sebacamide), poly(1 1-aminoundecanoic acid), and/or the like, and combinations thereof.

In illustrative embodiments the hygroscopic polymer is a hygroscopic elastomer. A variety of additives may be added to the polar polymer layer 78 to provide additional properties such as antimicrobial effects, odor control, static decay, and/or the like.

One or more of the polar polymer layer 78, the first cavitated core layer 72, and the second cavitated core layer 76 in the multi-layer non-breathable film 68 may include one or more adhesives for adhering the internal polar polymer layer 78 to contiguous layers to form at least a portion of the multi-layer film 68. In one example, adhesive may be components suitable for adhering two or more layers together. In one example, adhesives are compatibilizing adhesives that increase the compatibility of the layers as well as adhering the layers to one another. The adhesives may be included in the resin or other extrudable material before extruding that resin into the polar polymer layer 78. Representative compatibilizing adhesives include but are not limited to polyethylene/acrylate copolymer, ethylene/methyl acrylate copolymer, acid-modified acrylate, anhydride-modified acrylate, ethylene vinyl acetate, acid/acrylate-modified ethylene vinyl acetate, anhydride-modified ethylene vinyl acetate, and/or the like, and combinations thereof. In one example, when one of the first cavitated core layer 72, the second cavitated core layer 76, and the polar polymer layer 78 includes an adhesive, the adhesive may have a relatively high methacrylate content (e.g., a methacrylate content of at least about 20% to 25%). In some embodiments, the internal polar polymer layer 78 may be prepared from blends including up to about 50% by weight adhesive and at least about 50% by weight hygroscopic polymer.

In some embodiments, the hygroscopic polymer may be dried before it is extruded. Feeding pre-dried hygroscopic elastomer in small amounts to an extruder has proven to be effective in avoiding moisture absorption, preventing hydrolysis of the hygroscopic elastomer, and reducing or eliminating the formation of dark blue gels and holes in web. In some higher stretch ratio cases, gels rendered holes and even web break.

A multi-layer non-breathable barrier film 68 in accordance with the present disclosure may contain one or a plurality of polar polymer layers 78, each of which may be placed in any order in the inner layers of the film structure. In illustrative embodiments, the polar polymer layer 78 is not placed on the outer surface of the resultant film 68 in order to avoid damage caused by foreign materials. In one example, when the film 68 contains a plurality of polar polymer layers 78, individual polar polymer layers 78 are not placed adjacent to each other inside the film in order to increase efficacy. When a plurality of polar polymer layers 78 is used, the individual polar polymer layers 78 may differ from each other in thickness and/or type of thermoplastic polymer.

In one example, as shown in FIG. 9, a representative structure for a multi-layer breathable barrier film 68 contains five layers with one polar polymer layer 78 being in the center of the structure and two microporous, breathable cavitated core layers (72 and 74, respectively) being arranged symmetrically around the central polar polymer layer 78. In one example, the five-layer breathable barrier film has a $A^1$-$C^1$-B-$C^2$-$A^2$ structure as shown in FIG. 9, wherein: $A^1$ represents a first non-cavitated skin layer; $C^1$ represents a first microporous, breathable cavitated core layer; B represents a polar polymer layer; $C^2$ represents a second microporous breathable cavitated core layer, which may be the same as or different than the first microporous breathable cavitated core layer $C^1$; and $A^2$ represents a second non-cavitated skin layer, which may be the same as or different than the first non-cavitated skin layer $A^1$.

In one example, the first cavitated core layer 72 and/or the second cavitated core layer 76 ($C^1$ and/or $C^2$) contains polyethylene (e.g., metallocene polyethylene resin and/or low density polyethylene resin) and calcium carbonate. Additional adhesives, antioxidants, colorants, and/or processing aids may optionally be added. The microporous breathable cavitated core layer $C^1$ may differ from the microporous breathable film cavitated core layer $C^2$ in the amount and/or identity of solid filler present (e.g., calcium carbonate, barium sulfate, talc, glass spheres, other inorganic particles, etc.). The inner polar polymer layer B may contain a hygroscopic elastomer such as Dupont HYTREL PET and an adhesive such as Dupont BYNEL 3101 20% EVA or Dupont AC1820 acrylate, with additional antioxidants, colorants, and processing aids optionally being added. In one example, the inner polar polymer layer B contains adhesive and about 50% by weight or more of hygroscopic elastomer. Instead of a polyester elastomer, other hygroscopic polymers, such as ε-caprolactone, polyester block amides, polyester elastomers, polyamides, and blends thereof may be utilized as the inner polar polymer layer.

Multi-layer non-breathable films 68 of a type described above are not limited to any specific kind of film structure. Other film structures may likewise achieve the same or a similar result as the three-layer film 56 shown in FIG. 7 or the five-layer structure A-C-B-C-A shown in FIG. 9. Film structure is a function of equipment design and capability. For example, the number of layers in a film depends only on the technology available and the desired end use for the film. Representative examples of film structures that may be implemented in accordance with the present disclosure include but are not limited to the following, wherein A represents a non-cavitated skin layer (e.g., 13, 58, 60, 59, 61, 70, and/or 74) and C represents a microporous, breathable cavitated core layer (e.g., 3, 62, 63, 72, 76, and/or 82):

A-C-A
A-A-C-A
A-C-A-A
A-A-C-A-A
A-C-A-A-A
A-C-A-C-A
A-C-A-A-A-A
A-A-C-A-A-A-A
A-A-A-C-A-A-A
A-C-A-A-A-C-A
A-C-A-A-C-A-A
A-C-A-C-A-A-A
A-C-A-C-A-C-A
A-C-A-A-A-A-A
A-A-C-A-A-A-A-A
A-A-A-C-A-A-A-A
A-C-A-A-A-C-A.

In the above-described exemplary film structures, each of the microporous breathable cavitated core layers C may include two or more microporous breathable film layers in order to better control other film properties, such as the ability to bond to nonwovens. In addition, when the film structure further includes a polar polymer layer B (e.g., 78), some exemplary film structures include but are not limited to the following:

A-C-B-C-A
A-C-A-C-B-C-A
A-C-B-C-A-C-A
A-C-A-C-B-C-A-C-A
A-C-B-C-A-C-A-C-A
A-C-B-C-A-B-C-A

Additionally, die technology that allows production of multiple layers in a multiplier fashion may be used. For example, an ABA structure may be multiplied from about 10 to about 1000 times. The resulting 10-time multiplied ABA structure may be expressed as follows:

A-B-A-A-B-A-A-B-A-A-B-A-A-B-A-A-B-A-A-B-A-A-B-A-A-B-A

In some embodiments described above, the compositions used to extrude cavitated core layers (e.g., 3, 62, 63, 72, 76, and/or 82) contain a solid filler. Thus, upon stretching, the cavitated core layers becomes microporous and breathable. By contrast, non-cavitated skin layers (e.g., 13, 58, 60, 59, 61, 70, and/or 74) are generally not breathable since they do not contain a solid filler prior to stretching. However, in some embodiments, the thickness and composition of one or more skin layers of a multi-layer film in accordance with the present disclosure may be selected so that when the precursor film is subsequently stretched, the resulting film is breathable. In one example, a pair of skin layers sandwiching a core layer may be relatively thin and together account for no more than about 30% of the total film thickness. Thus, in some embodiments, regardless of whether or not a skin layer contains a solid filler, the skin layer may still be breathable. For example, the skin layer may include one or more discontinuities that are introduced during the stretching process. The likelihood of discontinuities forming in a skin layer may increase as the thickness of the skin layer subjected to stretching decreases.

Figure 10:
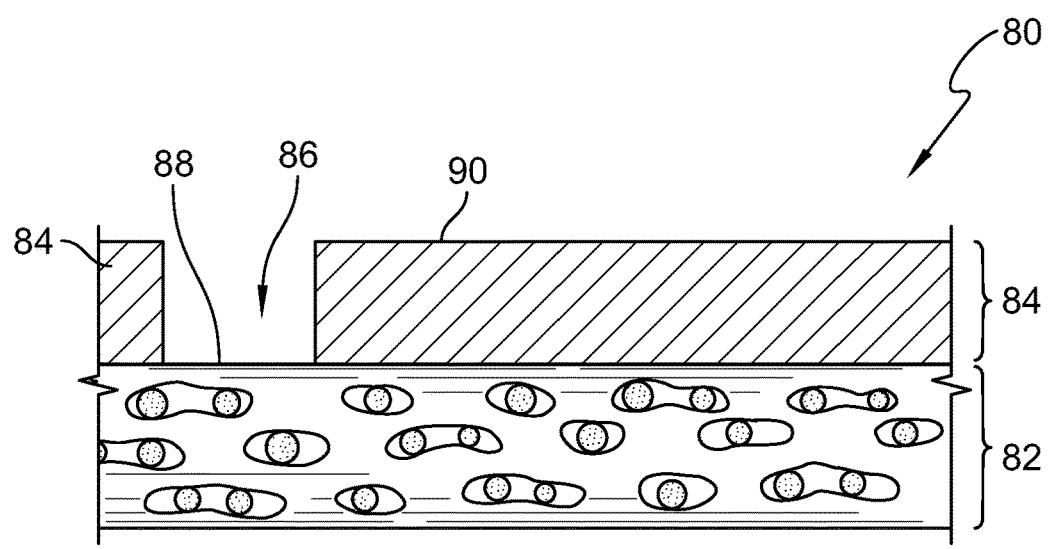
FIG. 10 is a diagrammatic view of a representative embodiment of a multi-layer partially-breathable film that includes two layers.

In some embodiments, as shown in FIG. 10, a multi-layer partially-breathable film 80 may be provided. As shown in FIG. 10, the multi-layer partially-breathable film 80 contains at least one cavitated core layer 82 and at least one skin layer 84. The cavitated core layer 82 contains one or a plurality of polyolefins and one or a plurality of inorganic fillers. The skin layer 84 includes one or a plurality of polyolefins, which may be the same as or different than the polyolefins of the cavitated core layer 82, and further includes one or a plurality of discontinuities 86. Due to the discontinuity 86 present in skin layer 84, the multi-layer partially-breathable film 80 has a microporous breathable region 88 and a non-microporous, non-breathable region 90.

The multi-layer partially-breathable film 80 may be formed, for example, by applying a surface modification technique, including but not limited to corona treatment, to the pre-stretched film. The surface modification technique may be used to treat regions of the pre-stretched film that are intended to become breathable, such that the film will be configured to break in the treated regions once it is subjected to stretching. Alternatively, a multi-layer partially-breathable film 80 may be formed by selectively applying CD-IMG stretching more aggressively to certain regions of the film (e.g., particular lanes) that are intended to become breathable. For example, portions of the quenched film that were previously subjected to selective cross-directional stretching may become breathable upon further downweb stretching in the machine direction, whereas portions of the quenched film that did not previously receive prior cross-directional stretching (or received less aggressive cross-directional stretching) may be configured to remain non-breathable even after being subjected to downweb machine direction stretching.

Representative applications using a multi-layer film (e.g., 2), a multi-layer non-breathable film (e.g., 56, 64, and/or 68) and/or a multi-layer partially-breathable film (e.g., 80) include but are not limited to medical gowns, diaper back sheets, drapes, packaging, garments, articles, carpet backing, upholstery backing, bandages, protective apparel, feminine hygiene, building construction, bedding and/or the like. Films in accordance with the present disclosure may be laminated to a fabric, scrim, or other film support by thermal, ultrasonic, and/or adhesive bonding. The support may be attached to at least one face of the film and or to both faces of the film. The laminate may be made using wovens, knits, nonwovens, paper, netting, or other films. Adhesive bonding may be used to prepare such laminates. Adhesive bonding may be performed with adhesive agents such as powders, adhesive webs, liquid, hot-melt and solvent-based adhesives. Additionally, these types of support may be used with ultrasonic or thermal bonding if the polymers in the support are compatible with the film surface. Laminates of the present multilayer films and nonwoven fabrics may provide surgical barriers. In one example, the fabrics are spunbonded or spunbond-meltblown-spunbond (SMS) fabrics. In another example, the fabrics may be spunlaced, airlaid, powder-bonded, thermal-bonded, or resin-bonded. The encasing of the polar polymer layer 78 protects the polar polymer layer 78 from mechanical damage or thermal damage and allows for thermal and ultrasonic bonding of the multilayer film at extremely low thicknesses.

Multi-layer non-breathable or partially breathable films in accordance with the present disclosure may be used for applications such as personal hygiene products. In illustrative embodiments, a personal hygiene product in accordance with the present disclosure includes at least one inner multi-layer film (e.g., 2, 56, 64, 68, and/or 80) prepared by a process as described above and at least one outer non-woven layer. At least one non-cavitated skin layer of a multi-layer film in accordance with the present disclosure is configured for attachment to and/or bonding with the outer non-woven layer. In some embodiments, the personal hygiene product further includes at least one polar polymer layer 78 disposed between a pair of non-cavitated skin layers, as shown in FIG. 9.

In one example, the at least one non-cavitated skin layer of a multi-layer film in accordance with the present disclosure is bonded to the at least one outer non-woven layer without an adhesive (e.g., via heat sealing, ultrasonic welding, and/or the like). In some embodiments, each of the at least one non-cavitated skin layer and the at least one outer non-woven layer includes polypropylene and/or polyethylene. In illustrative embodiments, each of the at least one non-cavitated skin layer and the at least one outer non-woven layer includes polypropylene.

In illustrative embodiments, the personal hygiene product in accordance with the present disclosure is configured as an incontinence brief, a diaper, a surgical gown, or a feminine hygiene product.

In some embodiments, as further explained below, a multi-layer film in accordance with the present disclosure may be used as an ultrathin backsheet (e.g., for a diaper). Functions of a diaper backsheet may include one or more of the following: (a) provide a barrier to liquid and solid waste (e.g., through the use of absorbent cores, which typically contain superabsorbent polymers); (b) provide a barrier to odor; (c) provide opacity to mask soiling (e.g., by loading a polymeric layer of the diaper backsheet with $TiO_2$); and (d) be able to carry print and/or artwork. With regard to (a), superabsorbent polymers (SAPs) are typically sharp-cornered particles with a tendency to rupture backsheets under compressive pressure or when dragged at a different speed from the barrier film. With regard to (c), the challenge increases with decreasing film thickness since the proportion of $TiO_2$ in the blend grows higher with any thickness decrease, and the $TiO_2$ adds cost and detracts from desired properties.

Heretofore, diaper backsheets have typically been embossed in order to better simulate a cloth-like appearance. However, virtually all diaper backsheets nowadays are covered with a non-woven material, and an emboss pattern no longer serves its original purpose.

It has been discovered that a chill cast quenching process in accordance with the present teachings may be used to prepare a microporous breathable film (a.k.a. a cavitated film) that has a thickness of as low as about 0.28 mils (about 6.7 gsm) and yet exceptionally good puncture strength. Thus, in view of the fact that an embossing process is no longer required for diaper backsheets, and in further view of the fact that a chill cast quenching process of a type described herein (e.g., vacuum box, air blanket, and/or air knife) may be used to form an exceptionally thin yet durable film, an ultrathin diaper backsheet exhibiting good puncture resistance to SAP particles may be prepared by bonding a simple non-woven layer to a multi-layer non-breathable film in accordance with the present disclosure (i.e., a multi-layer non-breathable film prepared by a chill cast quenching process of a type described herein).

As noted above, diaper fouling has heretofore typically been masked by loading a polymeric layer in the diaper backsheet with expensive $TiO_2$. Surprisingly and unexpectedly, it has been found that cavitation may serve as an alternative opacification aid to reduce or eliminate reliance on $TiO_2$ for masking diaper fouling. The at least one cavitated core layer (e.g., 3, 62, 63, 72, 76, and/or 82) present in a multi-layer film in accordance with the present teachings may thus be used to provide a low-cost alternative to opacification.

While neither desiring to be bound by any particular theory nor intending to limit in any measure the scope of the appended claims or their equivalents, it is presently believed that the cavitations induced by a solid filler (e.g., $CaCO_3$) when a film is activated serve to diffuse light at a lower cost than expensive $TiO_2$ particles. Although cavitation would likewise occur in a microporous breathable film prepared by a chill cast process in accordance with the present disclosure, microporosity/breathability is not required in the case of a diaper backsheet. Accordingly, the breathability aspect of a microporous breathable layer (e.g., a cavitated core layer) may be turned off or otherwise reduced (e.g., by attaching the cavitated core layer to at least one non-cavitated skin layer).

In illustrative embodiments, an ultrathin backsheet in accordance with the present disclosure may resemble the multi-layer non-breathable film 56 shown in FIG. 7. When bonded to a non-woven material, an ultrathin backsheet in accordance with the present disclosure may resemble the multi-layer structure 64 shown in FIG. 8. Since non-woven materials such as the non-woven layer 66 in FIG. 8 are typically polypropylene-based, the first non-cavitated skin layer 58 and the second non-cavitated skin layer 60 shown in FIG. 7 (also, the first non-cavitated skin layer 59 and the second non-cavitated skin layer 66 shown in FIG. 8) may likewise be polypropylene-based in order to be ultrasonically compatible with the nonwoven layer 66 and to be more thermally resistant to adhesive temperatures (a consideration that becomes increasingly important as film thicknesses decrease). A multi-layer film having non-filled non-cavitated skin layers will be more compatible with ultrasonic bonding than an analogous microporous layer that contains mineral filler at the surface or just beneath a thin non-breathable skin layer.

In addition, it has been found that a multi-layer non-breathable film 56 as shown in FIG. 7 having a polypropylene-based first non-cavitated skin layer 58 and a polypropylene-based second non-cavitated skin layer 60 feels softer to the touch and is quieter than a similar polypropylene-based film that does not contain at least one cavitated core layer 62. While neither desiring to be bound by any particular theory nor intending to limit in any measure the scope of the appended claims or their equivalents, it is presently believed that the cavitations present in the at least one cavitated core layer 62 confer the increased softness and quietness properties to multi-layer non-breathable films in accordance with the present disclosure. Both softness and quietness may be desirable attributes for applications such as diaper backsheets, incontinence briefs, and the like.

In illustrative embodiments, each of the first non-cavitated skin layer 58 and the second non-cavitated skin layer 60 shown in FIG. 7 contains polypropylene (e.g., homopolymer, impact copolymer). In some embodiments, the first non-cavitated skin layer 58 and the second non-cavitated skin layer 60 are comprised primarily of polypropylene (e.g., in some embodiments, greater than about 50 wt. %, 55 wt. %, 60 wt. %, 65 wt. %, 70 wt. %, 75 wt. %, 80 wt. %, 85 wt. %, 90 wt. %, 95 wt. %, 96 wt. %, 97 wt. %, 98 wt. %, or 99 wt. %). In other embodiments, the first non-cavitated skin layer 58 and the second non-cavitated skin layer 60 consist essentially of polypropylene. In illustrative embodiments, at least one of the first non-cavitated skin layer 58 and the second non-cavitated skin layer 60 is non-filled. In some embodiments, both of the first non-cavitated skin layer 58 and the second non-cavitated skin layer 60 are non-filled.

In illustrative embodiments, the at least one cavitated core layer 62 shown in FIG. 7 contains a polyolefin (e.g., polyethylene and/or polypropylene), $CaCO_3$ filler and, optionally, a minimal amount of $TiO_2$ (e.g., in order to achieve a desired opacity at minimum cost). Since breathability per se is not a desired property in this application, a lower grade of $CaCO_3$ may be used in place of the higher grades that may be preferable when breathability is a goal in and of itself). The multi-layer film 56 in FIG. 7 may be subjected to crossweb CD-IMG orientation to cavitate the core layer 62 and then to downweb MD stretch to add tensile strength for converting.

As the thickness of a backsheet film decreases, it may also be useful to include a layer that is highly impermeable to odorants. Polar molecules (e.g., nylon, EVOH, PET) may be used as described above in relation to FIG. 9. If such polar molecules are used, there are advantages to not using them as exterior layers since the polar molecules are less compatible thermally or adhesively with the polyolefins commonly used in disposable products. Moreover, these hydrophilic polymers may create extrusion problems when present on a film exterior. Similarly, a central non-breathable layer may be selected for toughness, stiffness, or thermal resistance properties, and there may be advantages with respect to curl or other processing issues in keeping such layers internal. If structures are made with hydrophobic and hydrophilic materials, tie adhesives may be blended in or co-extruded as tie layers.

The following examples and representative procedures illustrate features in accordance with the present disclosure, and are provided solely by way of illustration. They are not intended to limit the scope of the appended claims or their equivalents.

EXAMPLES

General

For production of the example films, an extrusion cast line with up to 3 extruders was used. The "A" and "B" extruders are 2½" in diameter, and the "C" extruder is 1¾" in diameter. The extruders feed into a combining feedblock manufactured by Cloeren Corporation of Orange, Tex., which can layer the A, B and C extruder outputs in a variety of configurations. From the feedblock, the molten polymer proceeds into a monolayer cast die (manufactured by Cloeren) that is about 36" wide. The die has an adjustable gap. For the samples described herein, the adjustable gap was maintained between 10 and 40 mils. The molten polymer drops down to a chill roll. For the samples described herein, the chill roll had an embossed pattern FST-250 which was engraved by Pamarco of Roselle, N.J. as their pattern P-2739. The embossed pattern P-2739 is a square pattern (e.g., with lines nearly aligned with the Machine Direction) with 250 squares per inch and a depth of about 31 microns. The roll itself has an 18" diameter with internal water cooling. The engrave roll pattern may be replaced with other patterns that are shallow enough not to interfere with a vacuum box quench. One alternative is a 40 Ra pattern (40 micro-inch average roughness) generated by a sand-blasting process on a chrome plated roll.

Comparison of Conventional Embossed Backsheet Film to Chill Cast Vacuum Box Backsheet Film In this experiment, a skinned multi-layer backsheet film having a structure CBBBC was prepared from the formulation XC3-828-2300.0 shown in Table 1.

TABLE 1

Composition of XC3-828-2300.0 Used to Make a CBBBC Skinned Multi-Layer Non-Breathable Film

| EXTRUDER | Layer % (Total) | COMPONENT | Amount of Component (Weight %) |
| --- | --- | --- | --- |
| B | 60 | CF7414 ($CaCO_3$) | 70 |
| | | EXCEED LL3518 (ExxonMobil, metallocene polyethylene resin, narrow MWD, density = 0.918 $g/cm^3$) | 30 |
| C (split) | 20/20 | C702-20 (Braskem, polypropylene impact copolymer) | 90 |
| | | LGA-105 (ExxonMobil, low density polyethylene resin) | 10 |

The composition of the $CaCO_3$-containing formulation (CF7414) listed in Table 1 is specified below in Table 2.

TABLE 2

Composition of the CF7414 Formulation Shown in Table 1.

| Component | Amount of Component |
| --- | --- |
| EXCEED LL3518 | 28 |
| FilmLink 500 ($CaCO_3$) | 60 |
| $TiO_2$ | 12 |

The molten web formed by extrusion of the composition XC3-828-2300.0 shown in Table 1 was quenched by a chill cast vacuum box process in accordance with the present disclosure on a 250T roll (1749.9 rpm setting). For comparison, two backsheet films having a structure ABBBA were prepared from a formulation XC3-828-2204.0 using a conventional embossing process. The physical properties of an ultrathin (9.26 gsm) backsheet film obtained from the composition XC3-828-2300.0 by a chill cast vacuum box process in accordance with the present disclosure, and the physical properties of two conventional backsheet films (10.16 gsm and 7.00 gsm) obtained from the composition XC3-828-2204.0, are summarized below in Table 3

TABLE 3

Comparison of Physical Properties of Backsheet Films Prepared by Conventional Embossing Process vs. Backsheet Film Prepared by Chill Cast Vacuum Box Process.

| Physical Property | Units | Comparative Examples (Conventional Embossing Process with XC3-828-2204.0 Formulation) | | Example (Chill Cast Vacuum Box Process with XC3-828-2300.0 Formulation) |
| --- | --- | --- | --- | --- |
| | | Comp. Ex A | Comp. Ex B | Ex. 1 |
| Basis Weight | g/m² | 10.16 | 7.00 | 9.26 |
| Emboss Depth | mil | 1.33 | 0.93 | 0.40 |
| Light Transmission | % | 69.4 | 77.7 | 60.3 |
| Gloss - | % @ 45° | 3.6 | 3.2 | 6.2 |
| Gloss - In | % @ 45° | 3.5 | 3.2 | 5.9 |
| COF, Static - Out | Index | 0.69 | 1.03 | 1.412 |
| COF, Static - In\In | Index | 1.62 | 1.95 | 1.432 |
| COF, Kinetic - Out | Index | 0.55 | 0.88 | 1.096 |
| COF, Kinetic - In\In | Index | 1.46 | 1.72 | 1.076 |
| Tensile Gauge MD | mil | 0.42 | 0.29 | 0.31 |
| Tensile @ Peak MD | grams/inch | 904 | 630 | 871 |
| Strain @ Peak MD | % | 492 | 425 | 242 |
| Tensile @ Break MD | grams/inch | 904 | 630 | 871 |
| Strain @ Break MD | % | 492 | 425 | 242 |
| Tensile @ Yield MD | grams/inch | 356 | 357 | 350 |
| Strain @ Yield MD | % | 20 | 39 | 10 |
| Tensile @ 5% Strain MD | grams/inch | 209 | 136 | 282 |
| Tensile @ 10% Strain MD | grams/inch | 289 | 201 | 354 |
| Tensile @ 25% Strain MD | grams/inch | 381 | 288 | 400 |
| Tensile @ 50% Strain MD | grams/inch | 481 | 390 | 412 |
| Tensile @ 100% Strain MD | grams/inch | 533 | 423 | 443 |
| Secant Modulus MD (1%) | PSI | 23773 | 22116 | 57,822 |
| TEA MD | FtLb/in² | 2681 | 2494 | 1,485 |
| MD Elmendorg Tear | gf | 20.9* | 9.8* | 12.7* |
| Tensile Gauge TD | mil | 0.42 | 0.29 | 0.31 |
| Tensile @ Peak TD | grams/inch | 578 | 348 | 293 |
| Strain @ Peak TD | % | 581 | 506 | 427 |
| Tensile @ Break TD | grams/inch | 577 | 347 | 292 |
| Strain @ Break TD | % | 581 | 505 | 427 |
| Tensile @ Yield TD | grams/inch | 255 | 186 | 226 |
| Strain @ Yield TD | % | 18 | 19 | 17 |
| Tensile @ 5% Strain TD | grams/inch | 145 | 93 | 140 |
| Tensile @ 10% Strain TD | grams/inch | 210 | 148 | 200 |
| Tensile @ 25% Strain TD | grams/inch | 260 | 188 | 234 |
| Tensile @ 50% Strain TD | grams/inch | 251 | 181 | 230 |
| Tensile @ 100% Strain TD | grams/inch | 259 | 185 | 220 |
| Secant Modulus TD (1%) | PSI | 19801 | 15243 | 26,463 |
| TEA TD | FtLb/in² | 1768 | 1460 | 1,177 |
| TD Elmendorf Tear | gf | 204 | 222 | 197 |
| Dart Drop (26") | g | 74 | 49 | 77 |
| § Slow Puncture - Out | gf | 616 | 422 | 293 |

The composition of formulation XC3-828-2204.0 used in Comparative Examples A and B is shown below in Table 4.

TABLE 4

Composition of XC3-828-2204.0 Used to Make Conventional Embossed Backsheet Films in Comparative Examples A and B

| EXTRUDER | Layer % (Total) | COMPONENT | Amount of Component (Weight %) |
| --- | --- | --- | --- |
| B | 60 | EXCEED LL3527 (ExxonMobil, metallocene polyethylene resin, narrow MWD, density = 0.927 g/cm³) | 62.5 |
| | | LGA-105 (ExxonMobil, low density polyethylene resin) | 20 |
| | | VISTAMAXX 6202 (ExxonMobil, olefinic elastomer performance polymer) | 7.5 |

TABLE 4-continued

Composition of XC3-828-2204.0 Used to Make Conventional Embossed Backsheet Films in Comparative Examples A and B

| EXTRUDER | Layer % (Total) | COMPONENT | Amount of Component (Weight %) |
| --- | --- | --- | --- |
| A (split) | 20/20 | 111017P White PE MB (Ampacet, white masterbatch LLD polyethylene) | 10 |
| | | PP3155 (ExxonMobil, polypropylene homopolymer) | 75 |
| | | LGA-105 (ExxonMobil, low density polyethylene resin) | 25 |

Surprisingly and unexpectedly, as shown by the data in Table 3, the multi-layer non-breathable film in accordance with the present disclosure (Ex. 1) essentially matched the tensile strength at peak machine direction of a much thicker conventional embossed film (Comp. Ex. A). In addition, the multi-layer non-breathable film in accordance with the present disclosure (Ex. 1) also exhibited higher tensile strength at 5% strain machine direction and substantially higher secant modulus machine direction (1%) than the much thicker conventional embossed film (Comp. Ex. A). Furthermore, surprisingly and unexpectedly, the multi-layer non-breathable film in accordance with the present disclosure (Ex. 1) exhibited a Dart Impact Strength that was greater than that of the much thicker conventional embossed film (Comp. Ex. A).

The embossed process is prone to draw resonance. As a result, microporous breathable films prepared by a conventional embossing process typically include LDPE to assist in the processing. However, for microporous breathable films prepared by a chill cast vacuum box quenching process in accordance with the present teachings, the LDPE may be omitted, thereby affording stronger films having properties that were heretofore unachievable with conventional films.

The invention claimed is:

1. A process for making a multi-layer non-breathable film, the multi-layer non-breathable film comprising a first non-cavitated skin layer, a second non-cavitated skin layer, and at least one cavitated core layer disposed between the first non-cavitated skin layer and the second non-cavitated skin layer, the process comprising the steps of
   extruding two or more extrudable materials to form a molten web, wherein at least a first extrudable material comprises a first polyolefin and an inorganic filler and is configured to form the at least one cavitated core layer, and wherein at least a second extrudable material comprises a second polyolefin and is configured to form each of the first non-cavitated skin layer and the second non-cavitated skin layer,
   casting the molten web against a surface of a chill roll using an air knife, air blanket, a vacuum box, or a combination thereof and without use of a nip to form a quenched film, and
   stretching the quenched film to form the multi-layer film, wherein the stretching comprises cross-directional intermeshing gear (CD-IMG) stretching and machine direction (MD) stretching,
   wherein the first polyolefin and the second polyolefin are the same or different,
   wherein the process for making the multi-layer non-breathable film does not include machine direction intermeshing gear (MD-IMG) stretching, and wherein the MD stretching occurs after the CD-IMG stretching.

2. The process of claim 1, wherein the first polyolefin and the second polyolefin are individually selected from the group consisting of polyethylene, polypropylene, and a combination thereof.

3. The process of claim 1, wherein the first polyolefin comprises polypropylene.

4. The process of claim 1, wherein the second polyolefin comprises polypropylene.

5. The process of claim 1, wherein the each of the first polyolefin and the second polyolefin comprises polypropylene.

6. The process of claim 1, wherein an average particle size of the inorganic filler is between about 0.1 microns and about 15 microns.

7. The process of claim 1, wherein the molten web is cast against the surface of the chill roll under negative pressure by the vacuum box.

8. The process of claim 1, wherein the molten web is cast against the surface of the chill roll under positive pressure by the air knife.

9. The process of claim 1, wherein the stretching further comprises cold drawing.

10. The process of claim 1 further comprising annealing the multi-layer non-breathable film in which the annealing is performed at a temperature of between about 75 degrees Fahrenheit and about 225 degrees Fahrenheit.

11. The process of claim 1 further comprising attaching at least a portion of either the first non-cavitated skin layer or the second non-cavitated skin layer to a nonwoven material.

12. The process of claim 11, wherein the nonwoven material and at least the portion of either the first non-cavitated skin layer or the second non-cavitated skin layer attached to the nonwoven material comprises polypropylene.

13. A process for making a multi-layer non-breathable film, the multi-layer non-breathable film comprising a first non-cavitated skin layer, a second non-cavitated skin layer, at least one cavitated core layer disposed between the first non-cavitated skin layer and the second non-cavitated skin layer, and at least one polar polymer layer disposed between the first non-cavitated skin layer and the second non-cavitated skin layer, the process comprising the steps of
   extruding three or more extrudable materials to form a molten web, wherein at least a first extrudable material comprises a first polyolefin and an inorganic filler and is configured to form the at least one cavitated core layer, wherein at least a second extrudable material comprises a second polyolefin and is configured to form each of the first non-cavitated skin layer and the second non-cavitated skin layer, and wherein at least a third extrudable material comprises a hygroscopic polymer and is configured to form the at least one polar polymer layer,
   casting the molten web against a surface of a chill roll using an air knife, air blanket, a vacuum box, or a combination thereof and without use of a nip to form a quenched film, and
   stretching the quenched film to form the multi-layer film, wherein the stretching comprises cross-directional intermeshing gear (CD-IMG) stretching and machine direction (MD) stretching,
   wherein the first polyolefin and the second polyolefin are the same or different,
   wherein the process for making the multi-layer non-breathable film does not include machine direction intermeshing gear (MD-IMG) stretching, and wherein the MD stretching occurs after the CD-IMG stretching.

14. The process of claim 13, wherein the hygroscopic polymer is selected from the group consisting of hygroscopic elastomers, polyesters, polyamides, polyetherester copolymers, polyetheramide copolymers, polyurethanes, polyurethane copolymers, poly(etherimide) ester copolymers, polyvinyl alcohols, ionomers, celluloses, nitrocelluloses, and a combination thereof.

15. The process of claim 13, wherein the third extrudable material further comprises an adhesive and the adhesive comprises polyethylene/acrylate copolymer, ethylene/methyl acrylate copolymer, acid-modified acrylate, anhydride-modified acrylate, ethylene vinyl acetate, acid/acrylate-modified ethylene vinyl acetate, anhydride-modified ethylene vinyl acetate, or a combination thereof.

16. The process of claim 13, wherein the polar polymer layer is selected from the group consisting of nylon, polyester, ethylene vinyl alcohol, a copolymer of nylon, a copolymer of polyester, a copolymer of ethylene vinyl alcohol, and a combination thereof.

17. The process of claim 12 wherein the nonwoven material is attached to at least the portion of either the first non-cavitated skin layer or the second non-cavitated skin layer without an adhesive.

18. The process of claim 17 wherein the nonwoven material is attached to at least the portion of either the first non-cavitated skin layer or the second non-cavitated skin layer via ultrasonic welding.

19. The process of claim 1 wherein the MD stretching and the CD-IMG stretching occur in a separate manufacturing process that is not in-line with formation of the quenched film.

20. The process of claim 13 wherein the MD stretching and the CD-IMG stretching occur in a separate manufacturing process that is not in-line with formation of the quenched film.

* * * * *